(12) United States Patent
Wang et al.

(10) Patent No.: US 7,885,086 B2
(45) Date of Patent: Feb. 8, 2011

(54) FORWARD CONVERTER WITH SELF-DRIVEN SYNCHRONOUS RECTIFIERS

(75) Inventors: Chih-Liang Wang, No. 131-3, Wuling St., Anle District, Keelung City (TW) 204; Ching-Sheng Yu, Wugu Township, Taipei County (TW)

(73) Assignees: GlacialTech, Inc., Taipei County (TW); Chih-Liang Wang, Keelung (TW)

( * ) Notice: Subject to any disclaimer, the term of this patent is extended or adjusted under 35 U.S.C. 154(b) by 380 days.

(21) Appl. No.: 12/199,860

(22) Filed: Aug. 28, 2008

(65) Prior Publication Data

US 2009/0080223 A1 Mar. 26, 2009

(30) Foreign Application Priority Data

Sep. 21, 2007 (TW) .............................. 96135431 A

(51) Int. Cl.
*H02M 3/335* (2006.01)
(52) U.S. Cl. .................................................. 363/21.06
(58) Field of Classification Search .............. 363/21.04, 363/21.06, 44, 52, 53, 84, 125, 127
See application file for complete search history.

(56) References Cited

U.S. PATENT DOCUMENTS

| | | | | |
|---|---|---|---|---|
| 6,188,592 B1 * | 2/2001 | Farrington et al. | ............ | 363/98 |
| 6,370,044 B1 * | 4/2002 | Zhang et al. | ............. | 363/21.06 |
| 6,473,317 B1 * | 10/2002 | Simopoulos | ............. | 363/21.06 |
| 6,538,905 B2 * | 3/2003 | Greenfeld et al. | ............. | 363/17 |
| 6,545,883 B2 * | 4/2003 | Xing et al. | ............... | 363/21.11 |
| 6,570,268 B1 * | 5/2003 | Perry et al. | .................. | 307/38 |
| 7,102,898 B2 * | 9/2006 | Brkovic | ....................... | 363/19 |
| 2008/0253150 A1 * | 10/2008 | Wingrove et al. | ........ | 363/21.14 |
| 2009/0257250 A1 * | 10/2009 | Liu | ......................... | 363/21.06 |
| 2009/0290391 A1 * | 11/2009 | Toccaceli | ................. | 363/21.14 |

* cited by examiner

*Primary Examiner*—Adolf Berhane
(74) *Attorney, Agent, or Firm*—Muncy, Geissler, Olds & Lowe, PLLC

(57) ABSTRACT

The present invention relates to a forward converter with self-driven synchronous rectifiers, which utilizes a secondary driving winding and a secondary driving circuit to drive the synchronous rectifiers in the secondary power loop. The secondary driving circuit, which is composed of a level shifter and a signal distributor, can shift the voltage waveform across the secondary driving winding by a predetermined level and distribute proper driving signals to the synchronous rectifiers to reduce the rectifier conduction loss. Specially, the channel of the freewheeling synchronous rectifier still can be turned on during the dead interval to further reduce the body diode conduction loss.

20 Claims, 23 Drawing Sheets

FORWARD CONVERTER WITH SELF-DRIVEN SYNCHRONOUS RECTIFIERS

CROSS-REFERENCE TO RELATED APPLICATIONS

This application claims the benefit under 35 U.S.C. 119(a)-(d), of Taiwan Application No. 96135431, filed Sep. 21, 2007, which is incorporated herein by reference in its entirety.

BACKGROUND OF THE INVENTION

1. Field of Invention

The present invention relates to a forward converter with self-driven synchronous rectifiers.

2. Related Art

A forward converter can be used to convert a high DC voltage source into multiple low DC voltage sources, where the master output is regulated by a closed-loop pulse width modulation (PWM) controller and slave outputs are regulated by secondary side post regulators (SSPR).

FIG. 1 is a block diagram illustrating the master output with synchronous rectifiers. The secondary power loop comprises a secondary power winding $T_s$, a forward synchronous rectifier $M_f$, a freewheeling synchronous rectifier $M_w$, a power inductor $L_1$ and a filter capacitor $C_1$. The closed-loop PWM controller comprises three blocks: (1) an error-amplifier circuit 1 samples the output voltage $V_1$ through a voltage divider and compares the output voltage sample with a reference voltage to generate an amplified error signal (voltage or current); (2) a control circuit 2 converts the amplified error signal into a PWM signal and (3) a drive circuit 3 converts the PWM signal into drive signals of $M_f$ and $M_w$.

The block diagrams of slave outputs with diode rectifiers are shown in FIG. 2a and FIG. 2b. The secondary power loop comprises a secondary power winding $T_{s2}$, a secondary side post regulator (SSPR) $S_1$, a forward diode rectifier $D_f$, a freewheeling diode rectifier $D_w$, a power inductor $L_2$ and a filter capacitor $C_2$. $S_1$ can be placed at either the high-side (FIG. 2a) or the low-side (FIG. 2b). $D_f$ can be placed at either the high-side or the low-side, depending on the materialization of $S_1$. $S_1$ can be implemented with either a magnetic amplifier (MA) or a controlled switch (CS). If $S_1$ is implemented with a MA, $D_f$ must be placed at the high-side and the switch controller 4 is a reset circuit. If $S_1$ is implemented with a CS, $D_f$ can be placed at either the high-side or the low-side and the switch controller 4 is a drive circuit. $S_1$ blanks the leading edge of the voltage waveform across $T_{s2}$ so that the average value of the voltage waveform across $D_w$ equals the output voltage $V_2$. The blanking effect of $S_1$ is illustrated with FIG. 3, where $V_{L1}$ is the voltage across $L_1$ in FIG. 1 and $V_{L2}$ is the voltage across $L_2$ in either FIG. 2a or FIG. 2b.

During the on-interval $0 \leq t \leq T_{on}$, the voltage across $T_s$ is positive with respect to its reference polarity; $M_f$ is turned on but $M_w$ is turned off; $V_{L1}$ is positive with respect to its reference polarity; $L_1$ stores electric energy through $T_s$, $M_f$ and $C_1$. During the blanking-interval $0 \leq t \leq T_{blank}$, the voltage across $T_{s2}$ is positive with respect to its reference polarity; $S_1$ is turned off; the voltage waveform across $T_{s2}$ is blanked by $S_1$; no current flows through $D_f$; the continuous current of $L_2$ forces $D_w$ to conduct; $V_{L2}$ is negative with respect to its reference polarity; $L_2$ releases electric energy through $D_w$ and $C_2$. During the non-blanking interval $T_{blank} \leq t \leq T_{on}$, the voltage across $T_{s2}$ is positive with respect to its reference polarity; $S_1$ is turned on; the voltage waveform across $T_{s2}$ is not blanked by $S_1$; the continuous current of $L_2$ commutates from $D_w$ to $D_f$; $V_{L2}$ is positive with respect to its reference polarity; $L_2$ stores electric energy through $D_f$, $T_{s2}$, $S_1$ and $C_2$.

During the reset-interval $T_{on} \leq t \leq T_{on} + T_{reset}$, the voltage across $T_s$ is negative with respect to its reference polarity; $M_f$ is turned off but $M_w$ is turned on; $V_{L1}$ is negative with respect to its reference polarity; $L_1$ releases electric energy through $M_w$ and $C_1$; the voltage across $T_{s2}$ is negative with respect to its reference polarity; $S_1$ is turned off; the continuous current of $L_2$ commutates $D_f$ from to $D_w$; $V_{L2}$ is negative with respect to its reference polarity; $L_2$ releases electric energy through $D_w$ and $C_2$.

During the dead-interval $T_{on} + T_{reset} \leq t \leq T_s$, the voltage across $T_s$ is 0; $M_f$ is turned off but $M_w$ is still turned on; $V_{L1}$ is negative with respect to its reference polarity; $L_1$ releases electric energy through $M_w$ and $C_1$; the voltage across $T_{s2}$ is 0; $S_1$ is turned off; $D_f$ is turned off but $D_w$ is turned on; $V_{L2}$ is negative with respect to its reference polarity; $L_2$ releases electric energy through $D_w$ and $C_2$.

If the drive circuit 3 in FIG. 1 is based on an integrated circuit (IC), $M_f$ and $M_w$ are referred to as IC-driven synchronous rectifiers. If it is based on a secondary driving winding, $M_f$ and $M_w$ are referred to as self-driven synchronous rectifiers. In general, a drive circuit based on an IC is more complicated and expensive than a drive circuit based on a secondary driving winding. As for slave outputs, $D_f$ and $D_w$ in either FIG. 2a or FIG. 2b suffer from higher rectifier conduction loss. Therefore, the present invention discloses a cost-effective approach to drive the self-driven synchronous rectifiers in the master output and slave outputs simultaneously.

SUMMARY OF THE INVENTION

For enhancing efficiency with low cost, the present invention is directed to a multiple-output forward converter with self-driven synchronous rectifiers.

In the master output, the drive circuit comprises a secondary driving winding, a level shifter (optional) and a signal distributor. The secondary driving winding induces a bipolar driving voltage from the forward transformer. The level shifter shifts the bipolar driving voltage by a predetermined level to a shifted bipolar driving voltage. The signal distributor distributes the (shifted) bipolar driving voltage to the gates of the forward and freewheeling synchronous rectifiers.

In slave outputs, the forward synchronous rectifier can be placed at either the high-side or the low-side. If the forward synchronous rectifier is placed at the high-side, it is self-driven by an additional secondary driving winding. If the forward synchronous rectifier is placed at the low-side, it can be self-driven by either an additional secondary driving winding or the driving voltage of the master forward synchronous rectifier. The freewheeling synchronous rectifier is self-driven by the driving voltage of the master freewheeling synchronous rectifier.

BRIEF DESCRIPTION OF THE DRAWINGS

FIG. 11a, FIG. 12a and FIG. 13a are diagrams illustrating three alternative practical circuits of slave outputs of multiple-output forward converters with high-side SSPR according to the present invention shown in FIG. 10a.

DETAILED DESCRIPTION OF THE INVENTION

Figure 1:
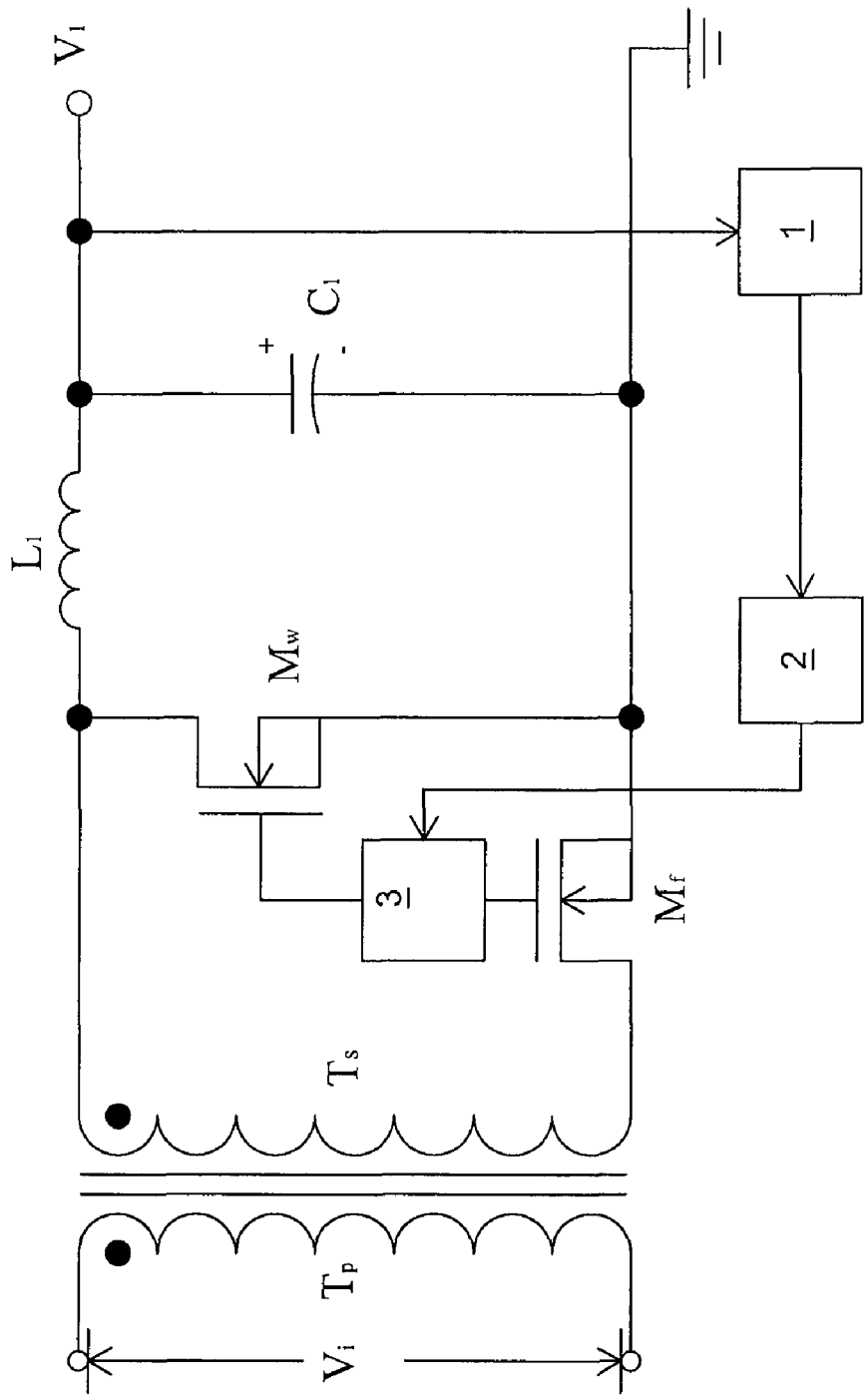
FIG. 1 is a block diagram illustrating the circuit of the master output of a conventional multiple-output forward converter with synchronous rectifiers.
Figure 2A:
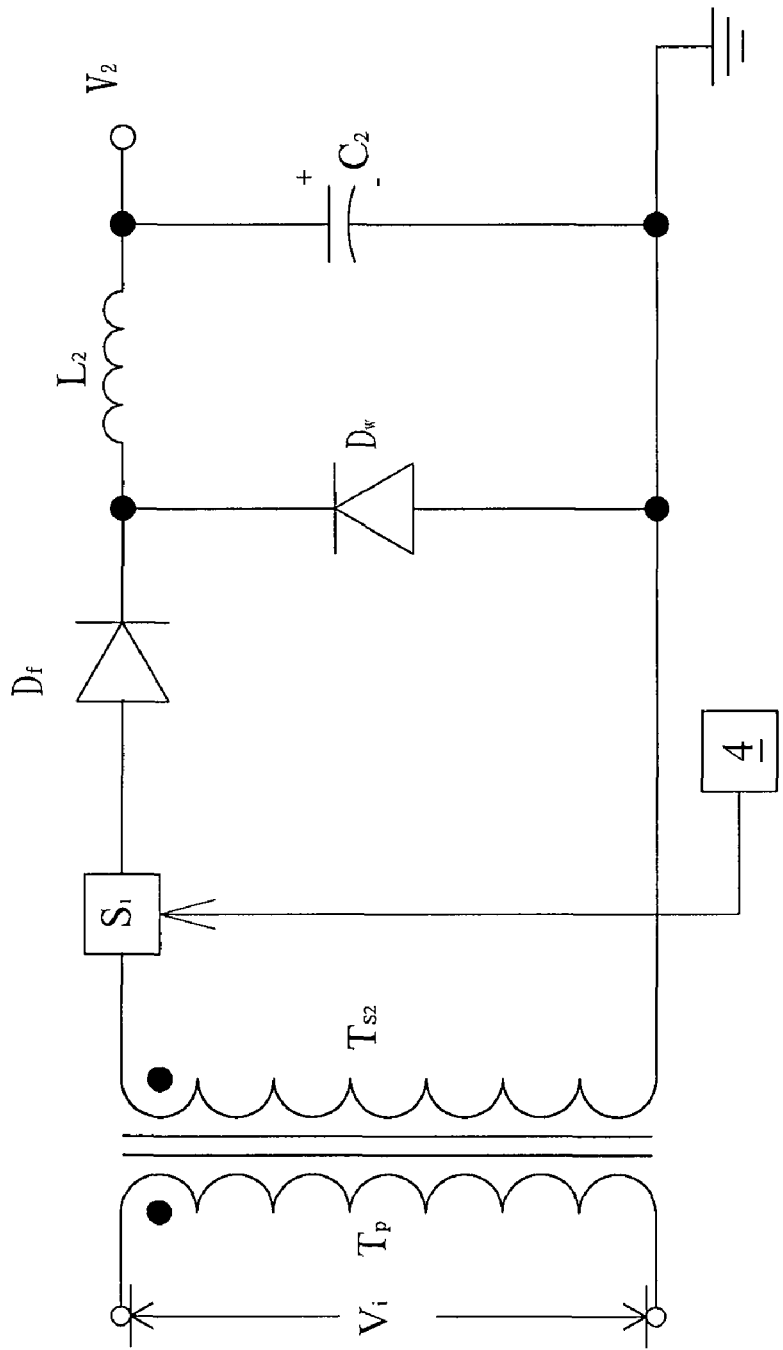
FIG. 2a and FIG. 2b are two block diagrams illustrating the alternative circuits of slave outputs of conventional multiple-output forward converters with diode rectifiers, wherein the SSPRs are placed at high-side and low-side respectively.
Figure 2B:
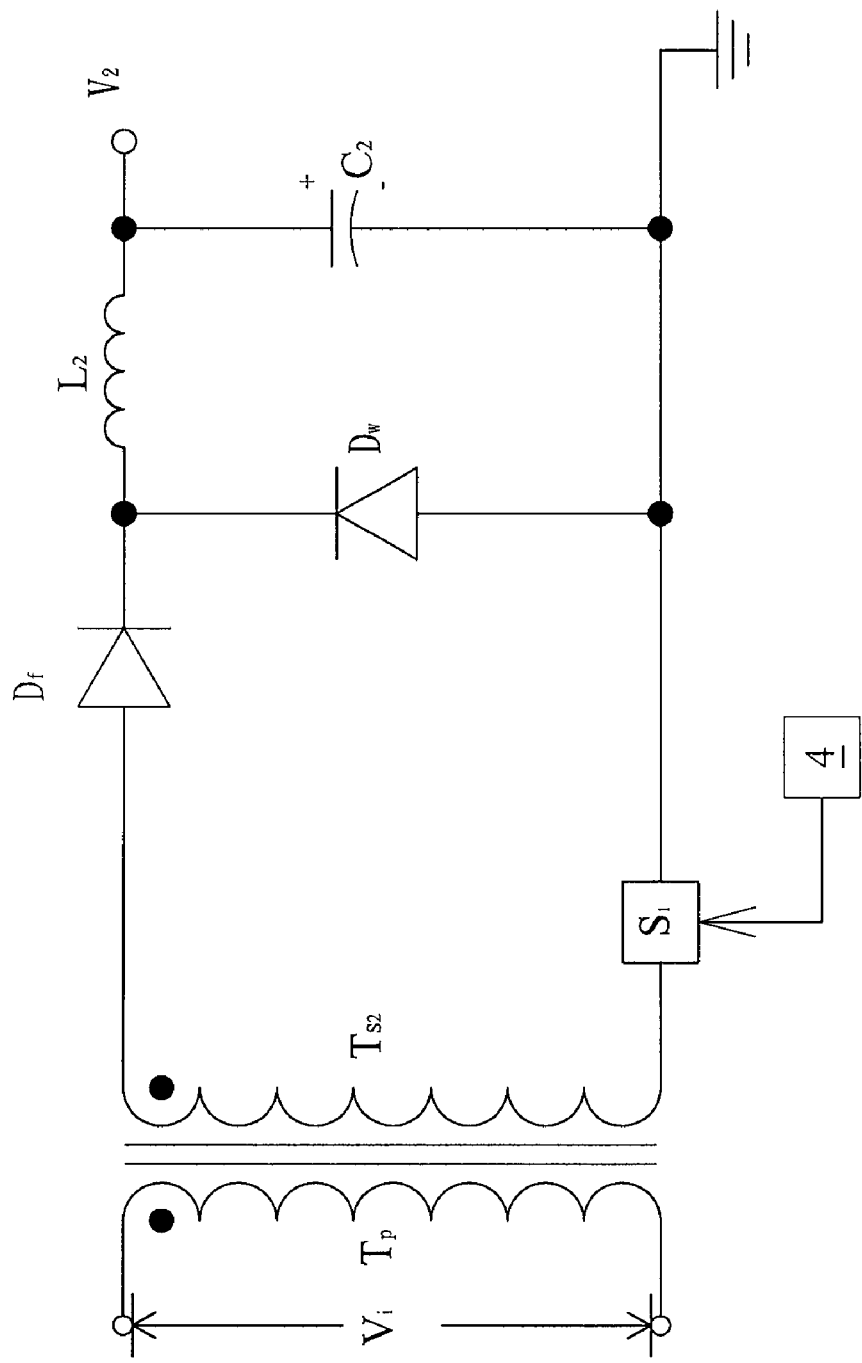
Figure 3:
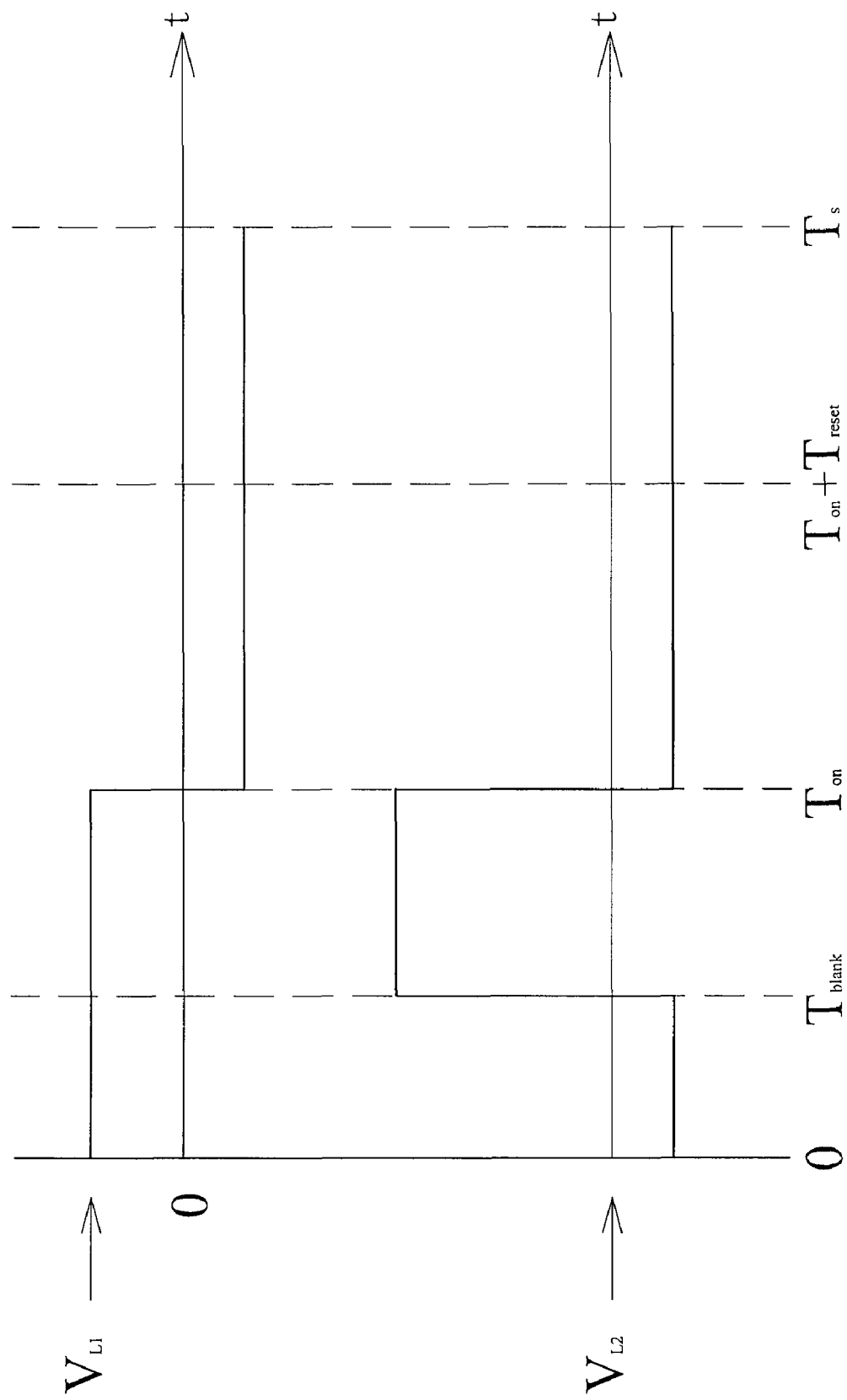
FIG. 3 is a time sequence diagram illustrating voltage waveforms across the power inductors of the master output and slave outputs of a conventional multiple-output forward converter.
Figure 4:
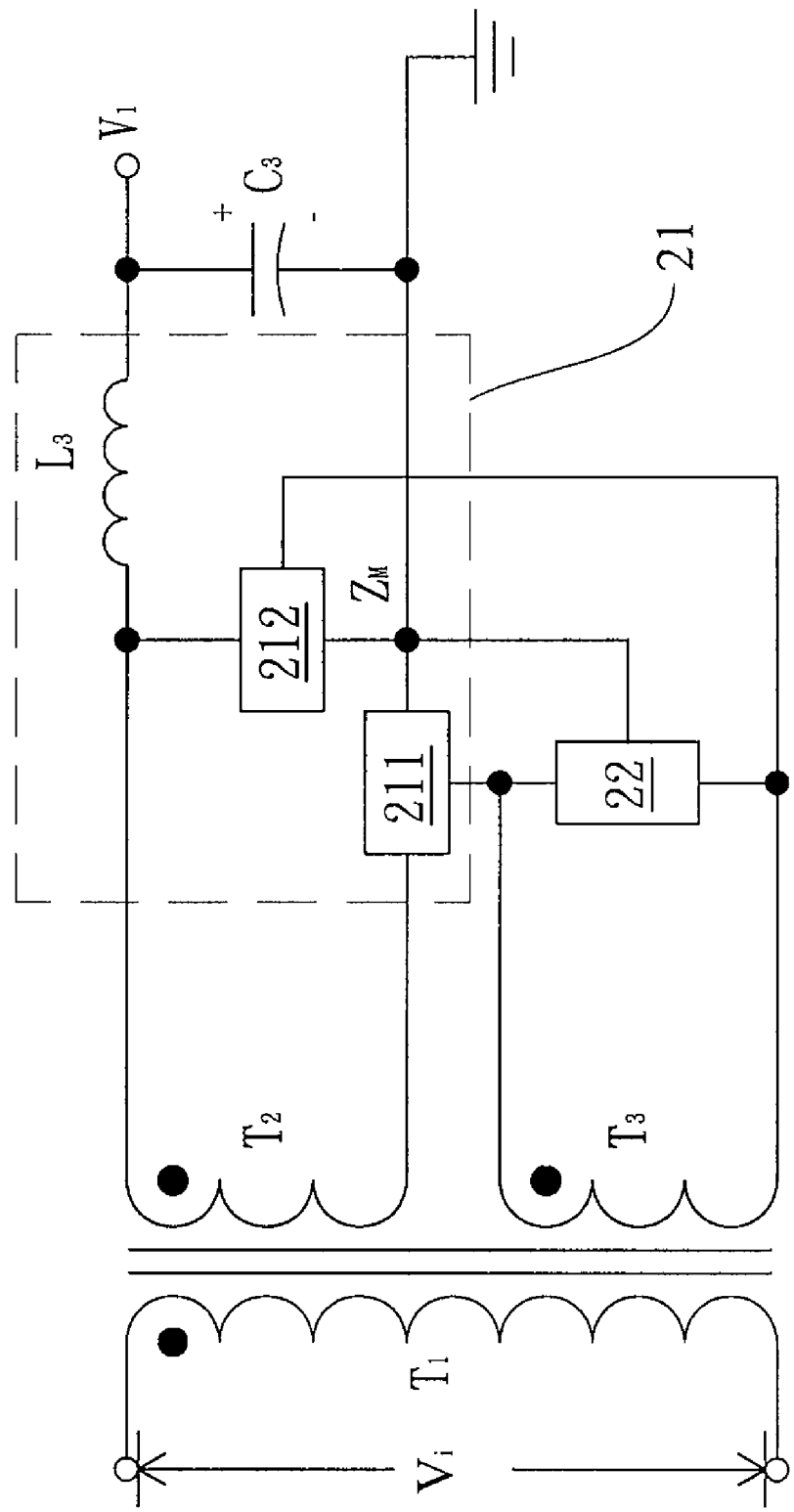
FIG. 4 is a block diagram illustrating the schematic circuit of the master output of a multiple-output forward converter according to the present invention.

FIG. 4 is a block diagram illustrating a schematic circuit of the master output of a multiple-output forward converter according to the present invention. The forward transformer includes a primary power winding $T_1$, a secondary power winding $T_2$ and a secondary driving winding $T_3$. The two terminals of the primary winding $T_1$ are connected in series to an input voltage $V_i$ through one or two primary switches (not shown).

The secondary power winding $T_2$, connecting a master power loop 21, includes a voltage output terminal (high voltage terminal) and a ground terminal (low voltage terminal) to provide a voltage $V_1$ for driving an external load circuit (not shown). A filter capacitor $C_3$ is connected between the voltage output terminal and the ground terminal. A power inductor $L_3$ is connected between the first terminal (marked with a dot) of the secondary power winding $T_2$ and the voltage output terminal. The dots of the primary and the secondary windings mean the same electric polarity.

The master power loop 21 includes a forward synchronous rectifier 211, a freewheeling synchronous rectifier 212 and a power inductor $L_3$. Each of the two synchronous rectifiers 211 and 212 includes a first terminal, a second terminal and a control terminal, where the control terminal receives a voltage signal to control the turn-on or turn-off of the channel between the first terminal and the second terminal. As shown in the figure, the first terminals of the two synchronous rectifiers 211 and 212 are respectively connected to the two terminals of the secondary power winding $T_2$; both of the second terminals of the two synchronous rectifiers 211 and 212 are connected to the common ground terminal $Z_M$.

Next, a signal distributor 22 comprises a first output terminal, a second output terminal and a common connection terminal. The first output terminal and the second output terminal are respectively connected to the two terminals of the secondary driving winding $T_3$ as well as the control terminals of the two synchronous rectifiers 211 and 212. The common connection terminal is connected to the common ground terminal $Z_M$.

When the voltage across $T_3$ is positive with respect to its reference polarity, the first output terminal of the signal distributor 22 is connected with the common connection terminal; a positive voltage signal is distributed to the control terminal of the forward synchronous rectifier 211; the channel of the forward synchronous rectifier 211 is turned on. When the voltage across $T_3$ is negative with respect to its reference polarity, the second output terminal of the signal distributor 22 is connected with the common connection terminal; a positive voltage signal is distributed to the control terminal of the freewheeling synchronous rectifier 212; the channel of the freewheeling synchronous rectifier 212 is turned on.

Figure 5:
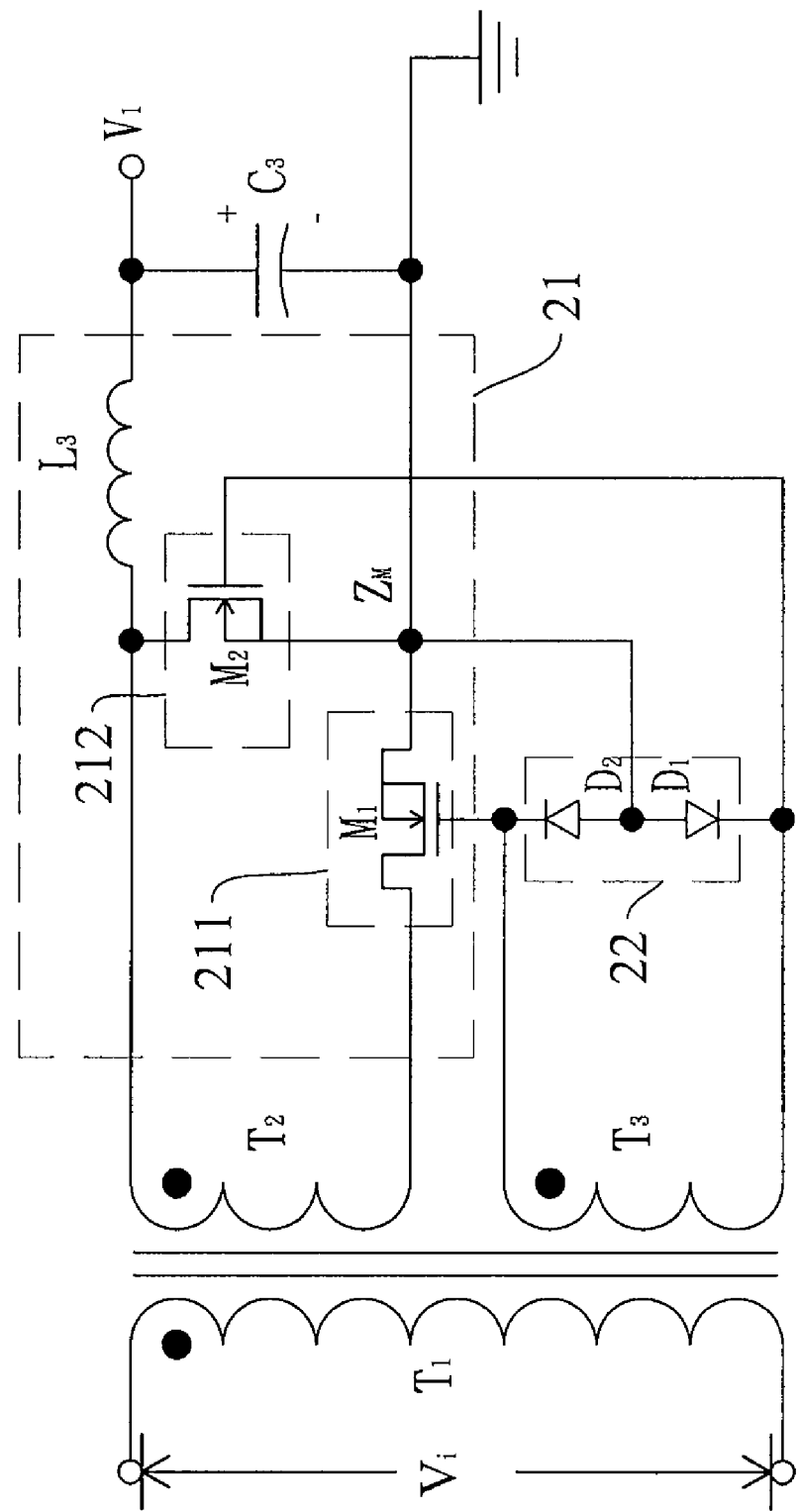
FIG. 5 is a diagram illustrating the practical circuit of the master output of a multiple-output forward converter according to the present invention.

FIG. 5 illustrates a practical circuit of the master output according to the embodiment in FIG. 4. As shown in the figure, two nMOSFET transistors $M_1$ and $M_2$ are respectively used as the forward synchronous rectifier 211 and the freewheeling synchronous rectifier 212 and referred to as a forward transistor $M_1$ and a freewheeling transistor $M_2$ respectively. In this example, gates, drains and sources of $M_1$ and $M_2$ respectively serve as the control terminals, the first terminals and the second terminals.

The signal distributor 22 includes two diodes $D_1$ and $D_2$. The anodes of $D_1$ and $D_2$ are connected to each other and the common ground terminal $Z_M$. The cathodes of $D_1$ and $D_2$ respectively serve as the first output terminal and the second output terminal and are connected to the gates of $M_2$ and $M_1$.

Figure 6:
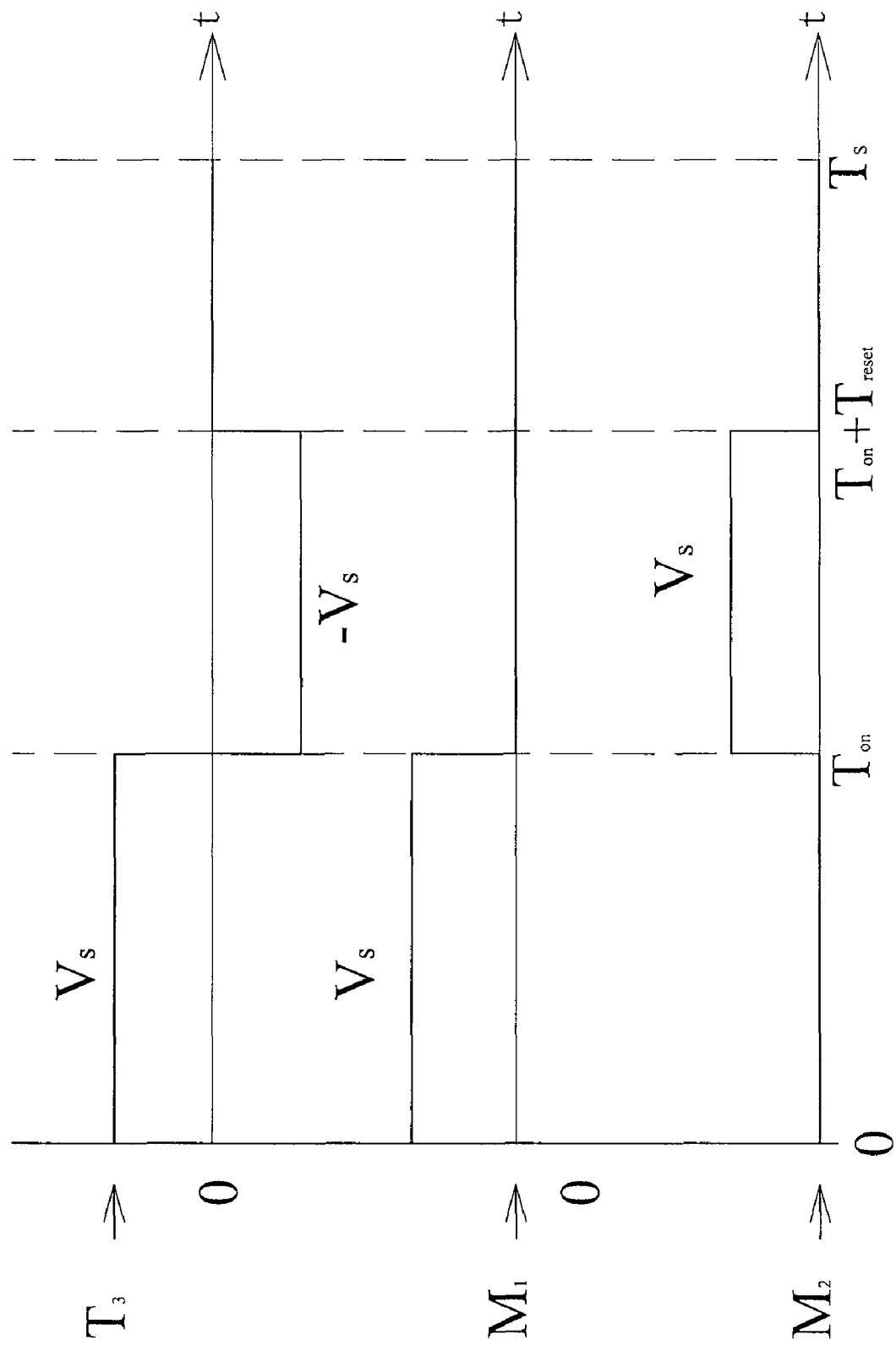
FIG. 6 is a time sequence diagram illustrating voltage waveforms of the secondary drive winding, the gate of the forward synchronous rectifier and the gate of the freewheeling synchronous rectifier of the master output shown in FIG. 5 within one switching period.

FIG. 6 illustrates voltage waveforms of the secondary drive winding, the gate of the forward synchronous rectifier and the gate of the freewheeling synchronous rectifier within one switching period in the master output according to the embodiment in FIG. 5.

During the on-interval $0 \leq t \leq T_{on}$, the voltage across $T_3$ is $V_s$; $D_1$ is turned on by a forward bias but $D_2$ is turned off by a reverse bias; the signal distributor 22 distributes a positive voltage $V_s$ and a zero voltage 0 to the gates of $M_1$ and $M_2$, respectively; $L_3$ stores electric energy through $T_2$, $M_1$ and $C_3$.

During the reset-interval $T_{on} \leq t \leq T_{on}+T_{reset}$, the voltage across $T_3$ is $-V_s$; $D_2$ is turned on by a forward bias but $D_1$ is turned off by a reverse bias; the signal distributor 22 distributes a positive voltage $V_s$ and a zero voltage 0 to the gates of $M_2$ and $M_1$, respectively; $L_3$ releases electric energy through $M_2$ and $C_3$.

During the dead-interval $T_{on}+T_{reset} \leq t \leq T_s$, the voltage across $T_3$ is 0; both $D_1$ and $D_2$ are turned off; both $M_1$ and $M_2$ are turned off; the continuous current of $L_3$ forces the body diode of $M_2$ to conduct; $L_3$ release electric energy through the body diode of $M_2$ and $C_3$.

It should be noted that the continuous current of $L_3$ flows through the body diode of $M_2$ during the dead-interval. This body diode conduction loss can be further reduced by introducing an additional level shifter 23 to the intermediate between the secondary driving winding $T_3$ and the signal distributor 22, as shown in FIG. 7.

As shown in the figure, the level shifter 23 includes a first input terminal, a second input terminal, a first output terminal and a second output terminal. The first input terminal and the second input terminal of the level shifter 23 are respectively connected to both terminals of $T_3$. The first output terminal and the second output terminal of the level shifter 23 are respectively connected to the first output terminal and the second output terminal of the signal distributor 22. In the level shifter 23, the second output terminal is identical to the second input terminal.

Figure 7:
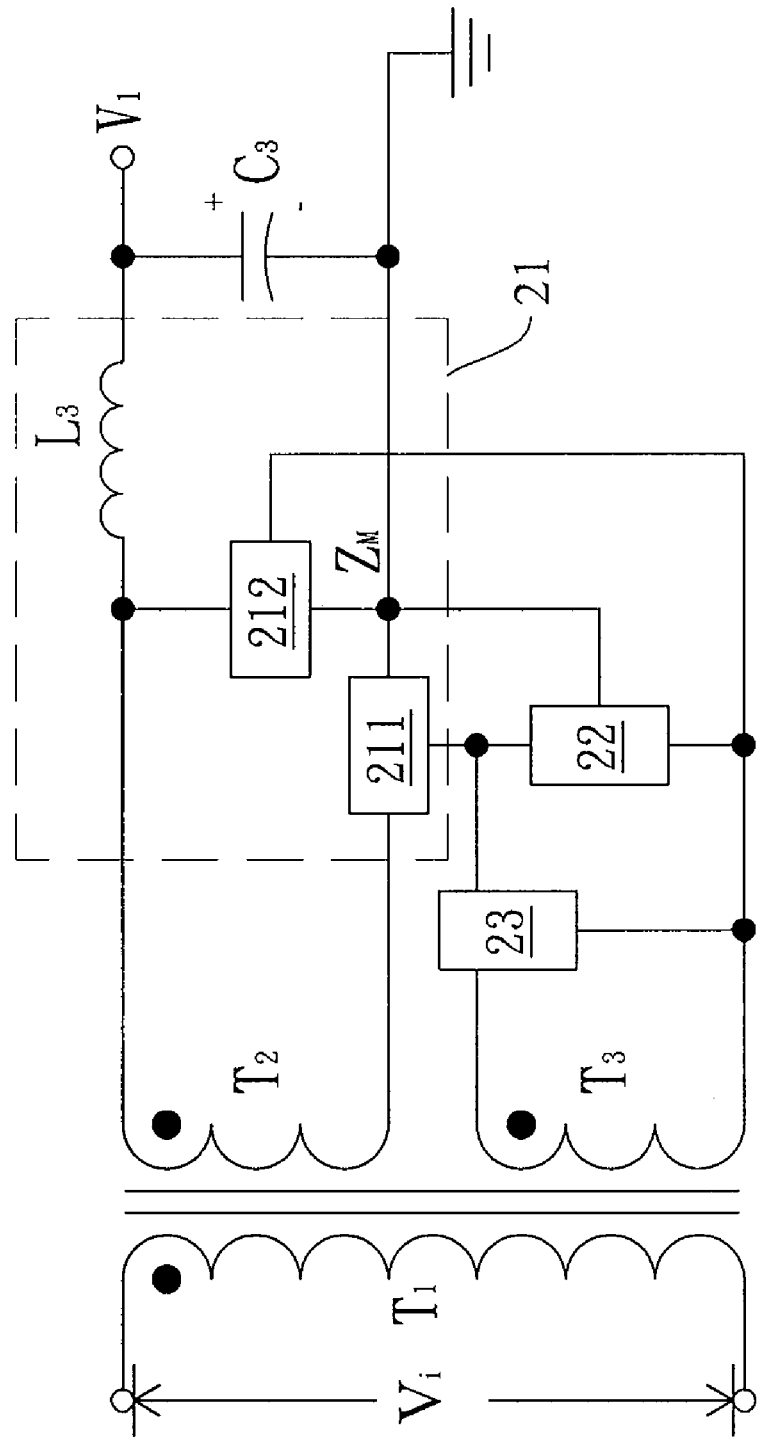
FIG. 7 is a block diagram illustrating the schematic circuit of the master output of a multiple-output forward converter with a level shifter according to the present invention.
Figure 8:
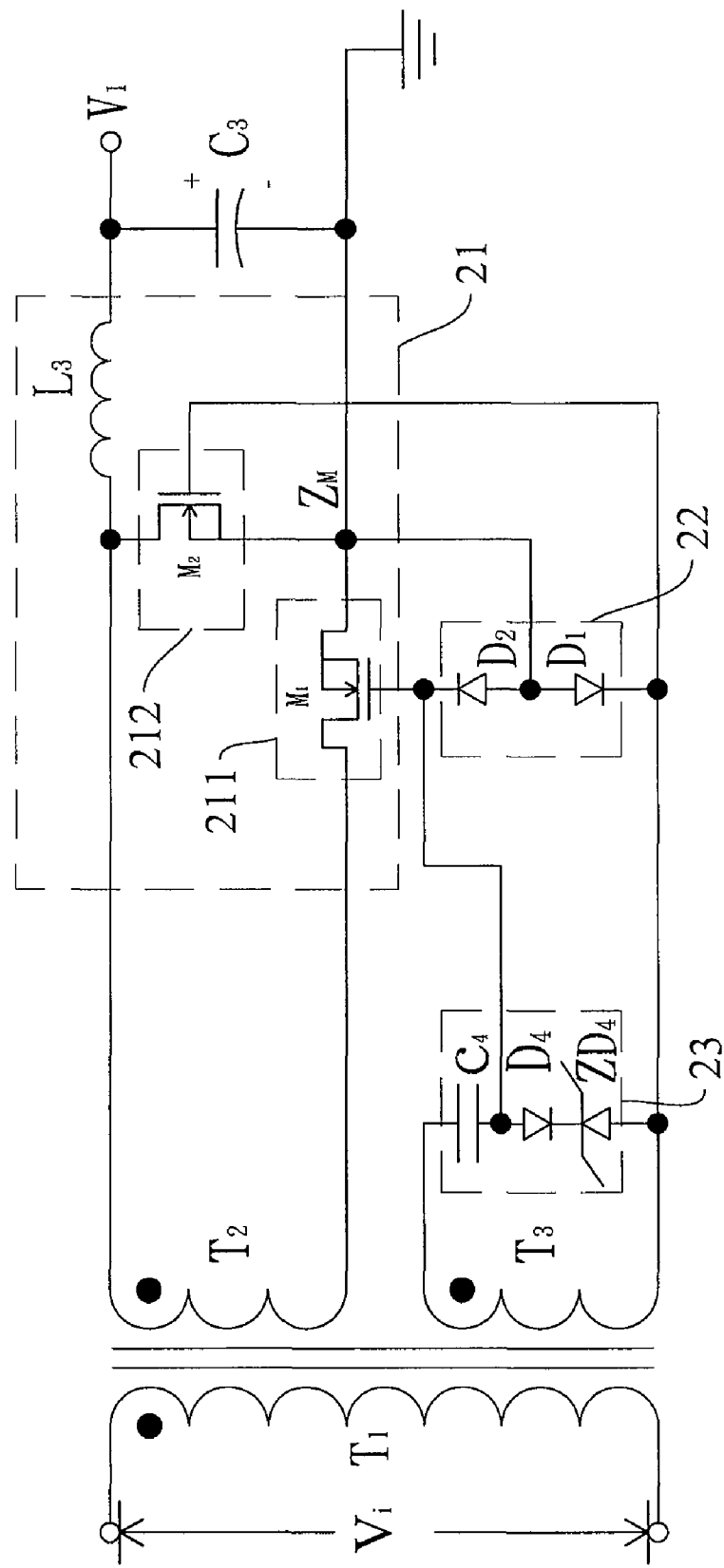
FIG. 8 is a diagram illustrating the practical circuit of the master output of a multiple-output forward converter with a level shifter according to the present invention.

FIG. 8 illustrates a preferred circuit of the master output according to the embodiment in FIG. 7. As shown in the figure, the level shifter 23 comprises a second capacitor $C_4$, a diode $D_4$ and a Zener diode $ZD_4$. One terminal of $C_4$ serves as the first input terminal and the other terminal of $C_4$ serves as the first output terminal, which is also connected with the anode of $D_4$. The anode of $ZD_4$ serves as the second input terminal as well as the second output terminal. The cathode of $D_4$ is connected with the cathode of $ZD_4$.

Figure 9:
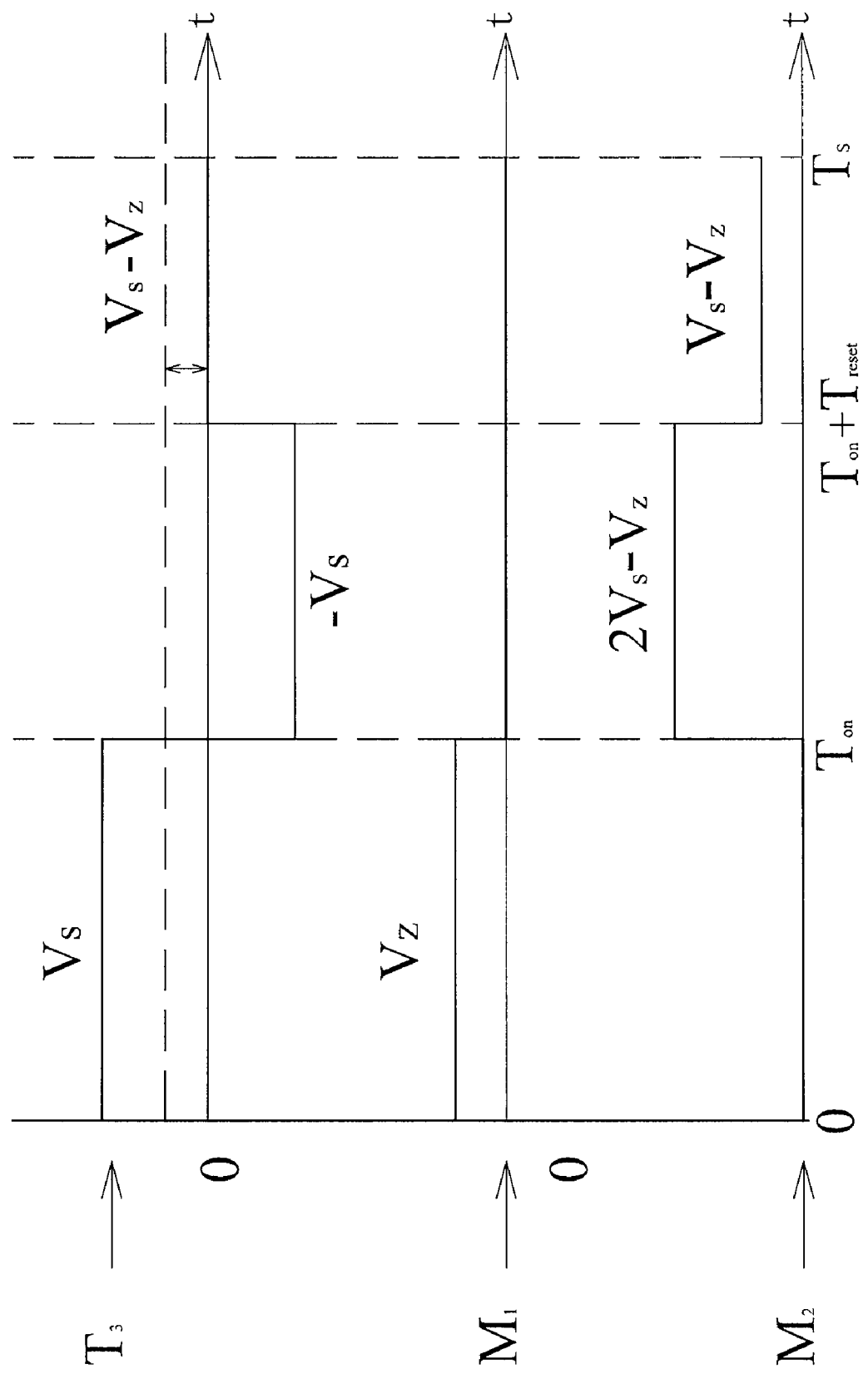
FIG. 9 is a time sequence diagram illustrating voltage waveforms of the secondary drive winding, the gate of the forward synchronous rectifier and the gate of the freewheeling synchronous rectifier of the master output shown in FIG. 8 within one switching period.

FIG. 9 illustrates voltage waveforms of the secondary drive winding, the gate of the forward synchronous rectifier and the gate of the freewheeling synchronous rectifier within one switching period in the master output according to the embodiment in FIG. 8. The dashed line marks the output voltage waveform of the level shifter.

For simplicity, assume the capacitance of $C_4$ is large enough to maintain a nearly constant DC voltage across its two terminals within one switching period; the forward voltage drop of all diodes is $V_f=0$; the breakdown voltage of $ZD_4$ is $V_z$; the voltage level shifted by the level shifter 23 is $V_r=V_s-V_z$.

During the on-interval $0 \leq t \leq T_{on}$, the voltage across $T_3$ is $V_s$; $D_4$ is turned on by a forward bias; $ZD_4$ breaks down; $C_4$ is recharged to a voltage $V_r$; $D_1$ is turned on by a forward bias but $D_2$ is turned off by a reverse bias; the signal distributor 22 distributes a positive voltage $V_z$ and a zero voltage to the gates of $M_1$ and $M_2$, respectively; $L_3$ stores electric energy through $T_2$, $M_1$ and $C_3$.

During the reset-interval $T_{on} \leq t \leq T_{on}+T_{reset}$, the voltage across $T_3$ is $-V_s$; both $D_4$ and $ZD_4$ are turned off; $D_2$ is turned on by a forward bias but $D_1$ is turned off by a reverse bias; the signal distributor 22 distributes a positive voltage $2V_s-V_z$ and a zero voltage to the gates of $M_2$ and $M_1$, respectively; $L_3$ releases electric energy through $M_2$ and $C_3$.

During the dead-interval $T_{on}+T_{reset} \leq t \leq T_s$, the voltage across $T_3$ is 0; both $D_4$ and $ZD_4$ are turned off; $D_2$ is turned on by a forward bias but $D_1$ is turned off by a reverse bias; the signal distributor 22 distributes a positive voltage $V_s-V_z$ and a zero voltage to the gates of $M_2$ and $M_1$, respectively; $L_3$ releases electric energy through $M_2$ and $C_3$.

Table 1 lists the comparison between FIG. 6 and FIG. 9:

TABLE 1

|  | on-interval | | reset-interval | | dead-interval | |
| --- | --- | --- | --- | --- | --- | --- |
|  | without level shifter | with level shifter | without level shifter | with level shifter | without level shifter | with level shifter |
| $M_1$ | $V_s$ | $V_z$ | 0 | 0 | 0 | 0 |
| $M_2$ | 0 | 0 | $V_s$ | $2V_s-V_z$ | 0 | $V_s-V_z$ |

It can be clearly seen from Table 1 that the gate voltage of $M_2$ during the dead-interval in FIG. 9 is $V_s-V_z$; the continuous current of $L_3$ flows through the channel of $M_2$. Therefore, the body diode conduction loss during the dead-interval in FIG. 5 can be reduced by introducing an additional level shifter 23 to the intermediate between the secondary driving winding $T_3$ and the signal distributor 22 in FIG. 8.

Figure 10A:
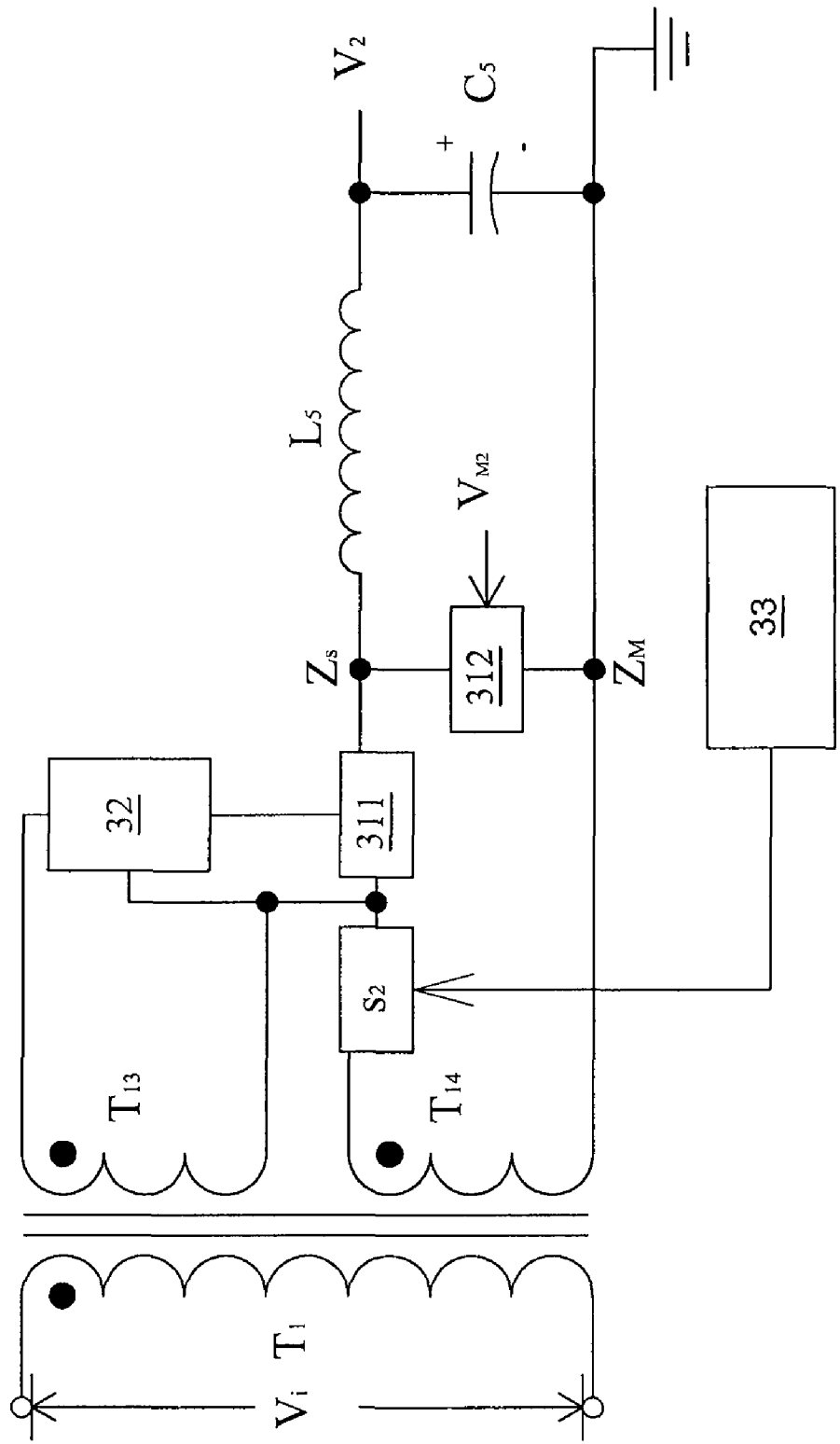
FIG. 10a and FIG. 10b are two block diagrams illustrating the alternative circuits of the slave outputs of multiple-output forward converters with additional driving circuits according to the present invention, wherein the SSPRs are placed at high-side and low-side respectively.
Figure 10B:
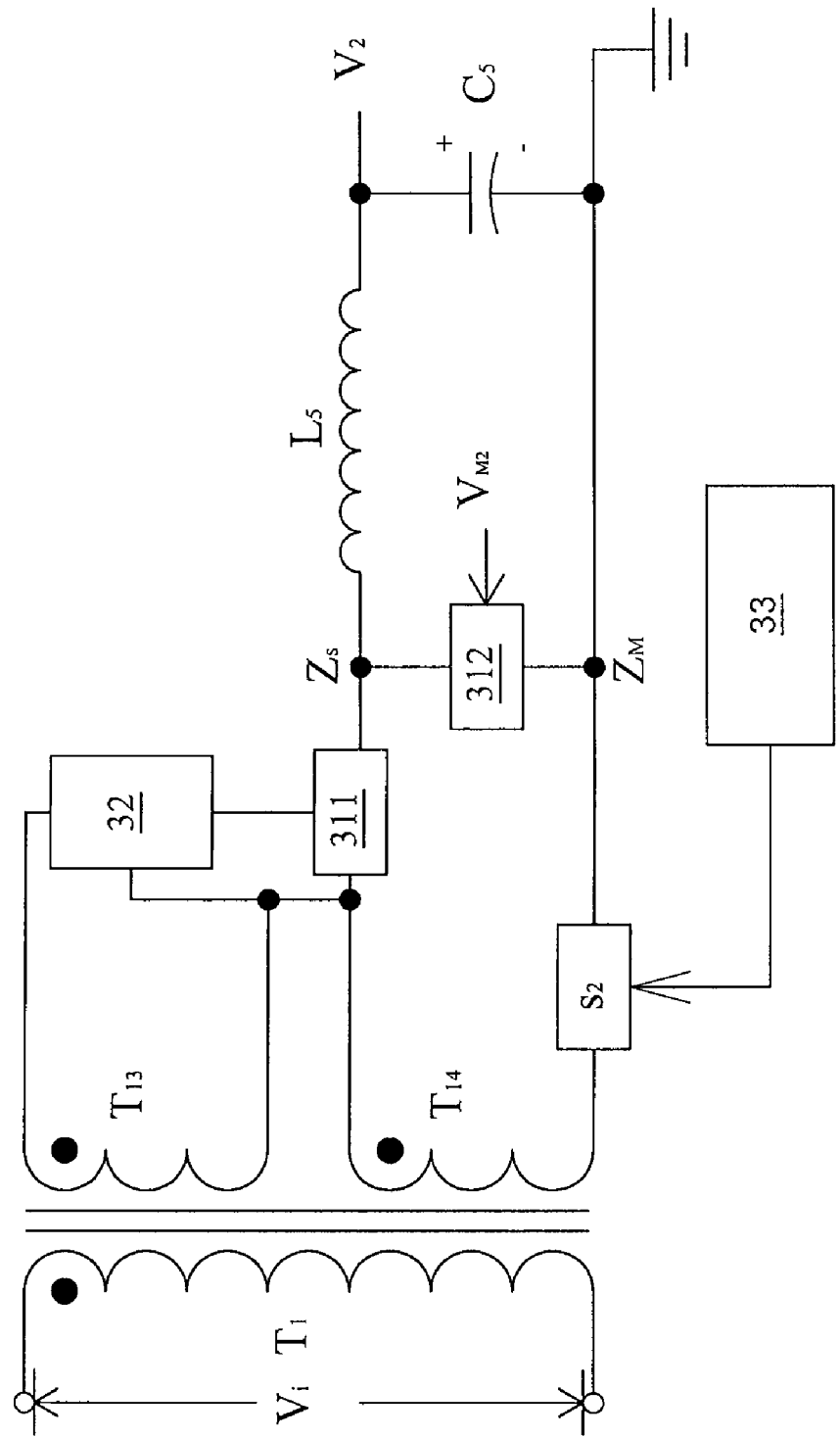

FIG. 10a and FIG. 10b illustrate two alternative schematic circuits of slave outputs of multiple-output forward converter with self-driven synchronous rectifiers according to an embodiment of the present invention, wherein the SSPRs $S_2$ can be placed at high-side or low-side, and the SSPR $S_2$ can be implemented with either a magnetic amplifier (MA) driven by a reset circuit or a controlled switch (CS) driven by an integrated circuit (IC) driver. If $S_2$ is implemented with a MA, the forward synchronous rectifier 311 is emphatically placed at the high-side and self-driven by an additional drive circuit 32 based on an additional secondary driving winding $T_{13}$, and the switch controller 33 is a reset circuit. If $S_2$ is implemented with a CS, the forward synchronous rectifier 311 can be placed at the low-side or high-side and self-driven by the additional drive circuit 32, and the switch controller 33 is an IC driver. Moreover, the slave forward synchronous rectifier 311 can be driven by the driving voltage of the master forward synchronous rectifier shown as FIG. 16.

The slave power loop includes a forward rectifier 311, a freewheeling rectifier 312, a power inductor $L_5$, a SSPR $S_2$ and a slave filter capacitor $C_5$. In the situation of high-side slave forward rectifier 311, the slave forward rectifier 311, the slave freewheeling rectifier 312 and the power inductor $L_5$ are connected at the common point $Z_s$. The other terminal of the power inductor $L_5$ connected to an auxiliary voltage output terminal. The slave filter capacitor $C_5$ is connected between the auxiliary voltage output terminal and the ground terminal of the slave power loop for providing a slave output voltage $V_2$. In the other situation (not shown) of low-side slave forward rectifier 311, the slave forward rectifier 311 and the slave freewheeling rectifier 312 is connected at the common ground terminal, same as the common ground terminal $Z_m$ of the master power loop.

If the forward rectifier 311 is driven by an additional drive circuit 32, an additional secondary driving winding $T_{13}$ is used to drive the additional drive circuit 32.

Figure 11A:
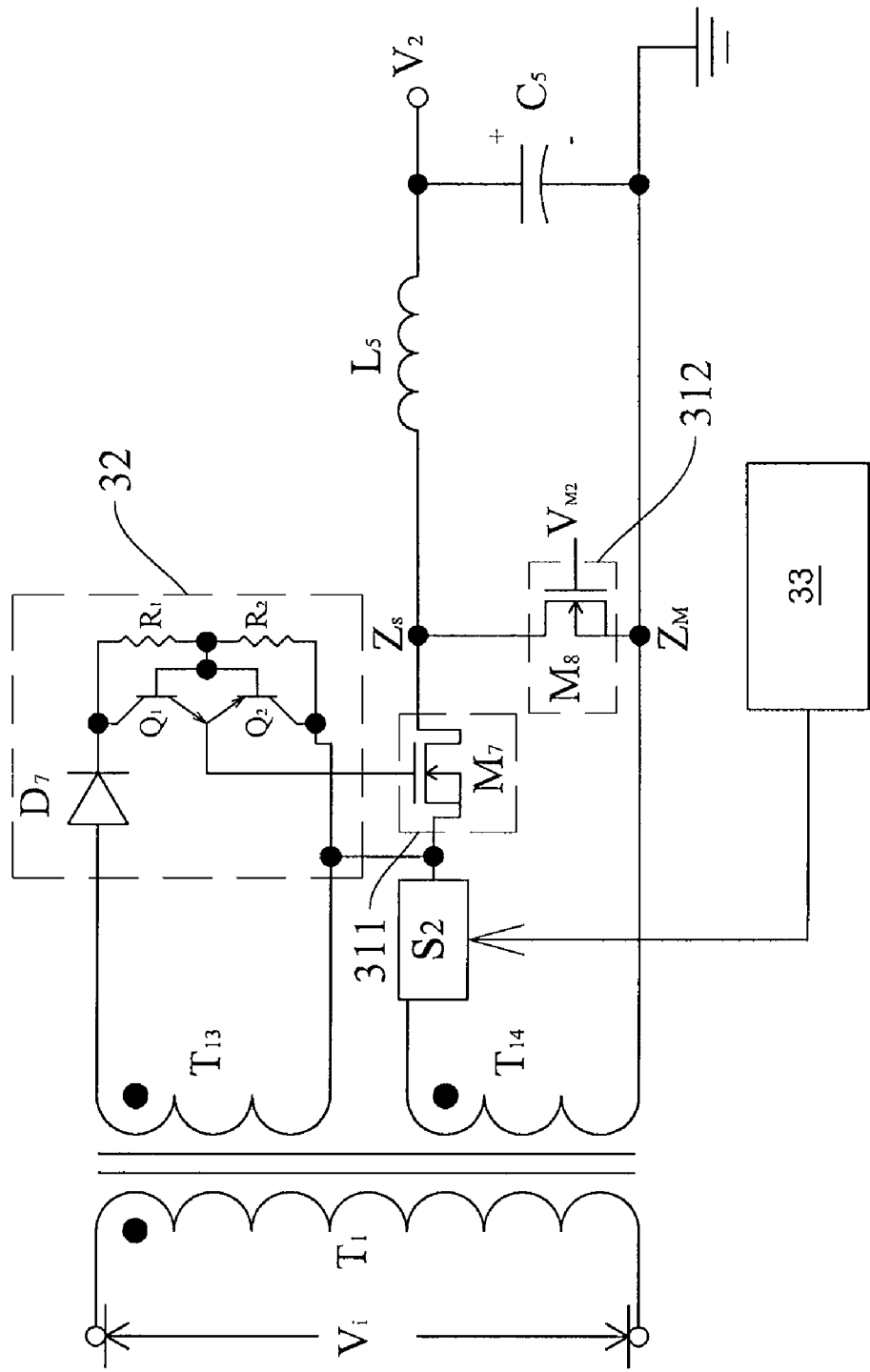
Figure 11B:
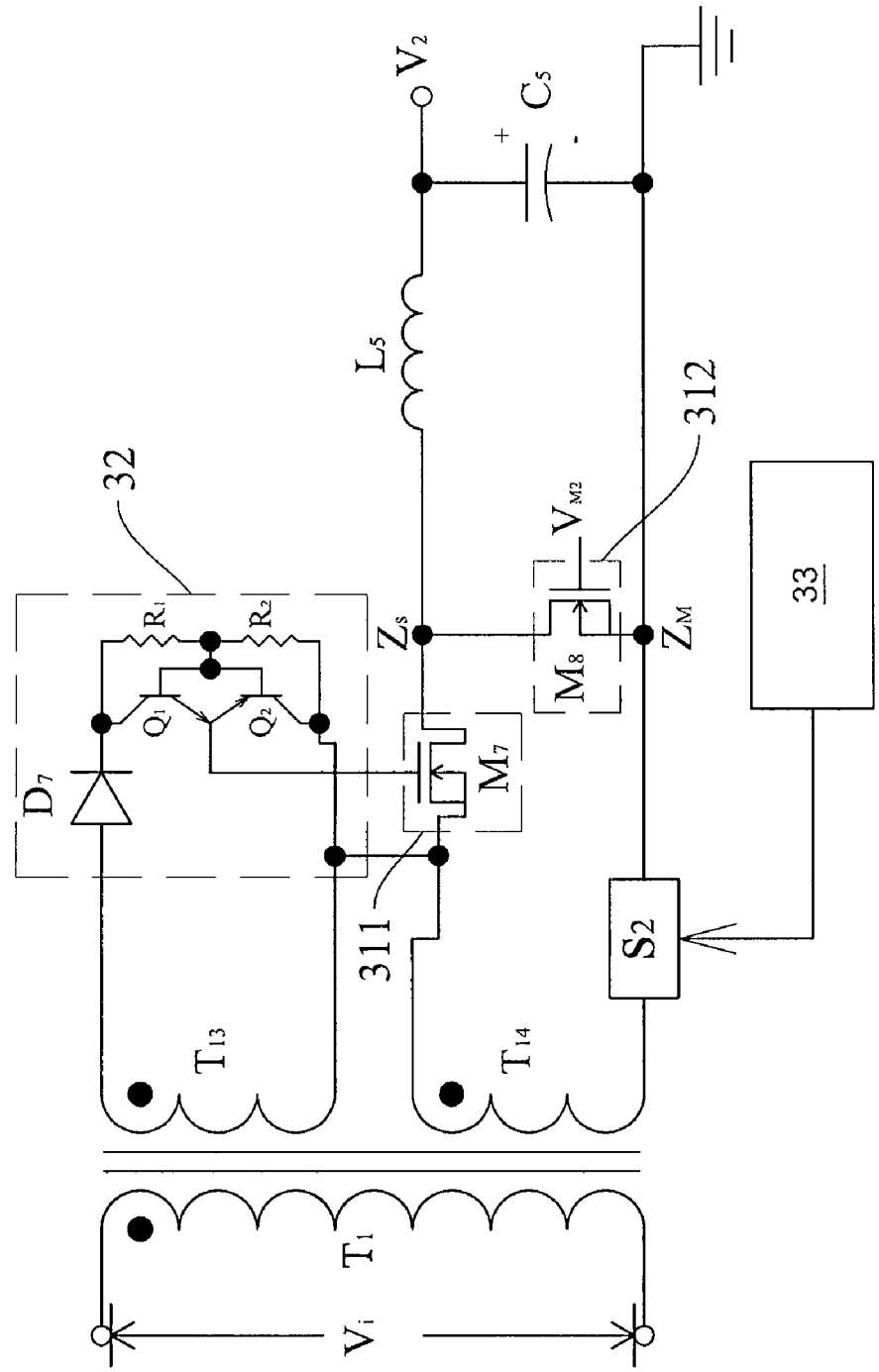
FIG. 11b, FIG. 12b and FIG. 13b are diagrams illustrating three alternative practical circuits of slave outputs of multiple-output forward converters with low-side SSPR according to the present invention shown in FIG. 10b.
Figure 12A:
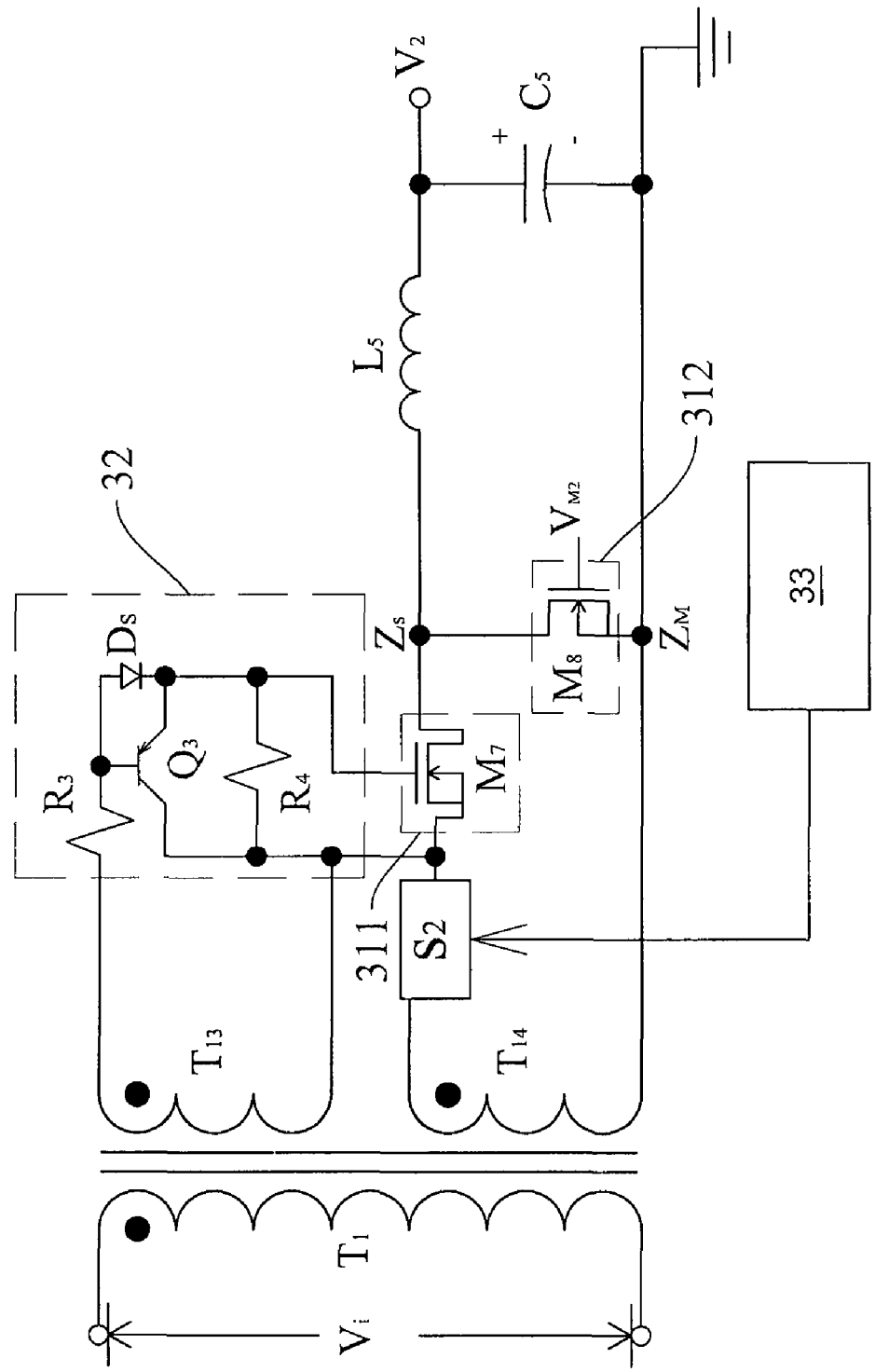
Figure 12B:
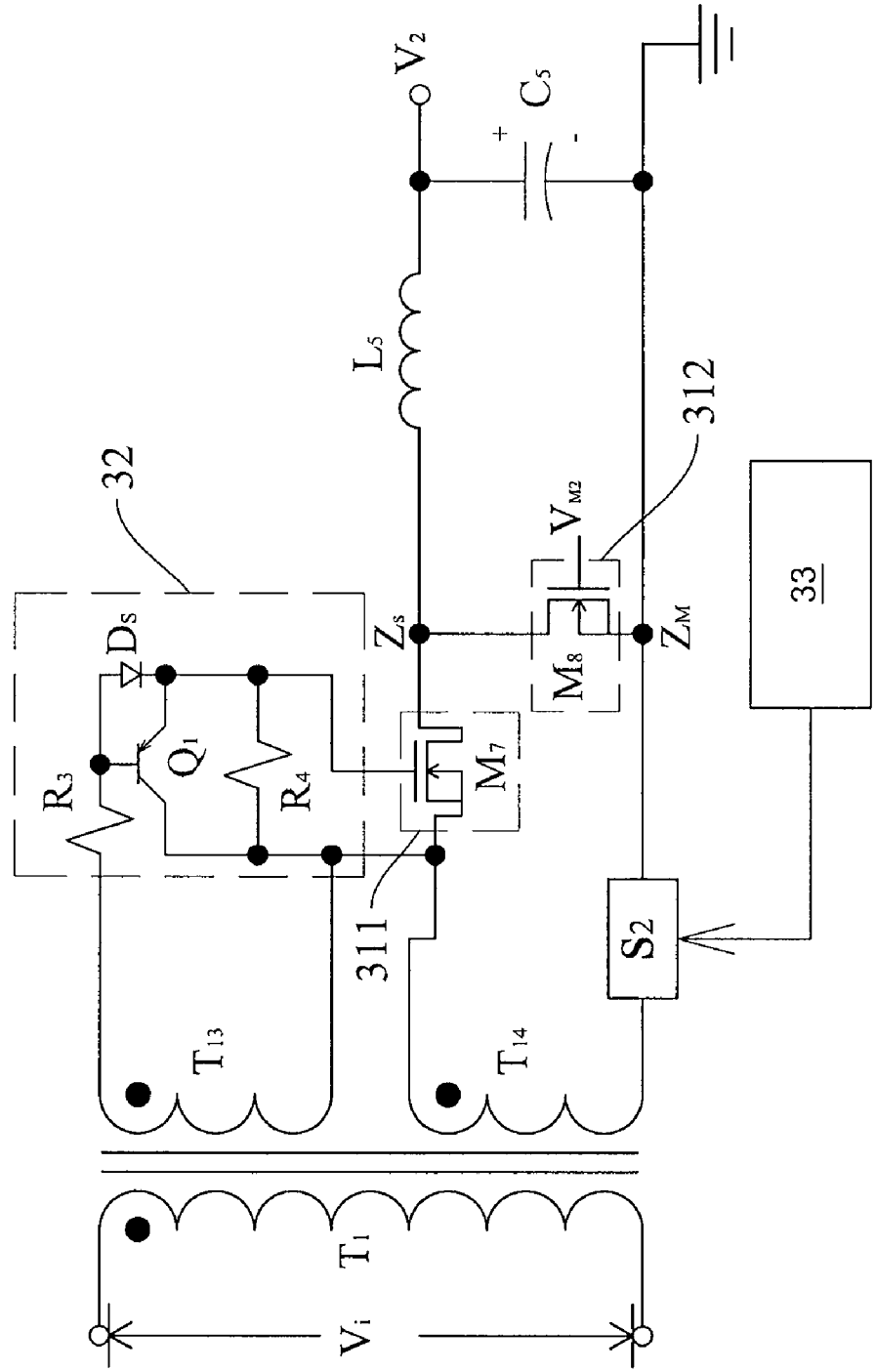
Figure 13A:
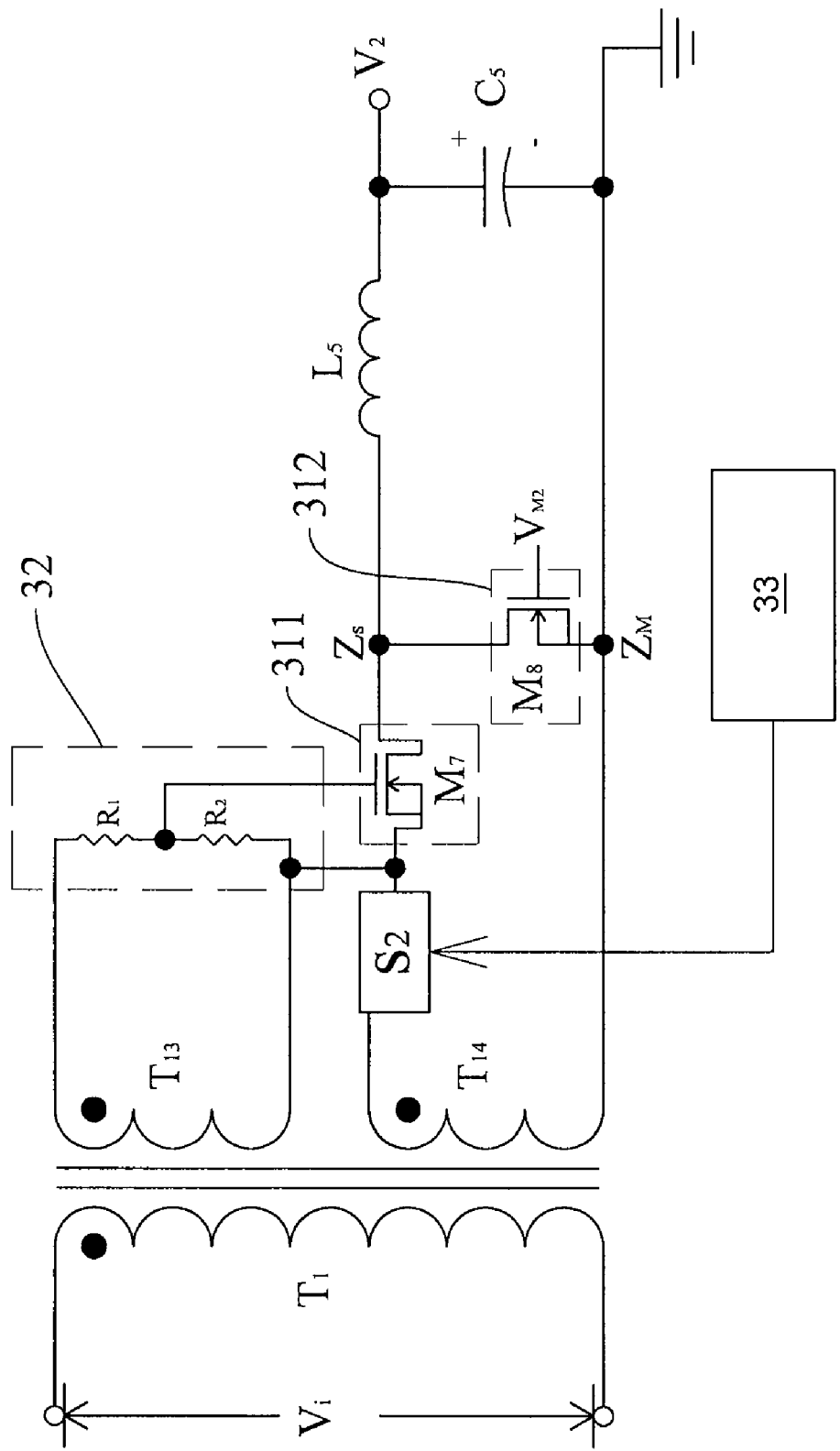
Figure 13B:
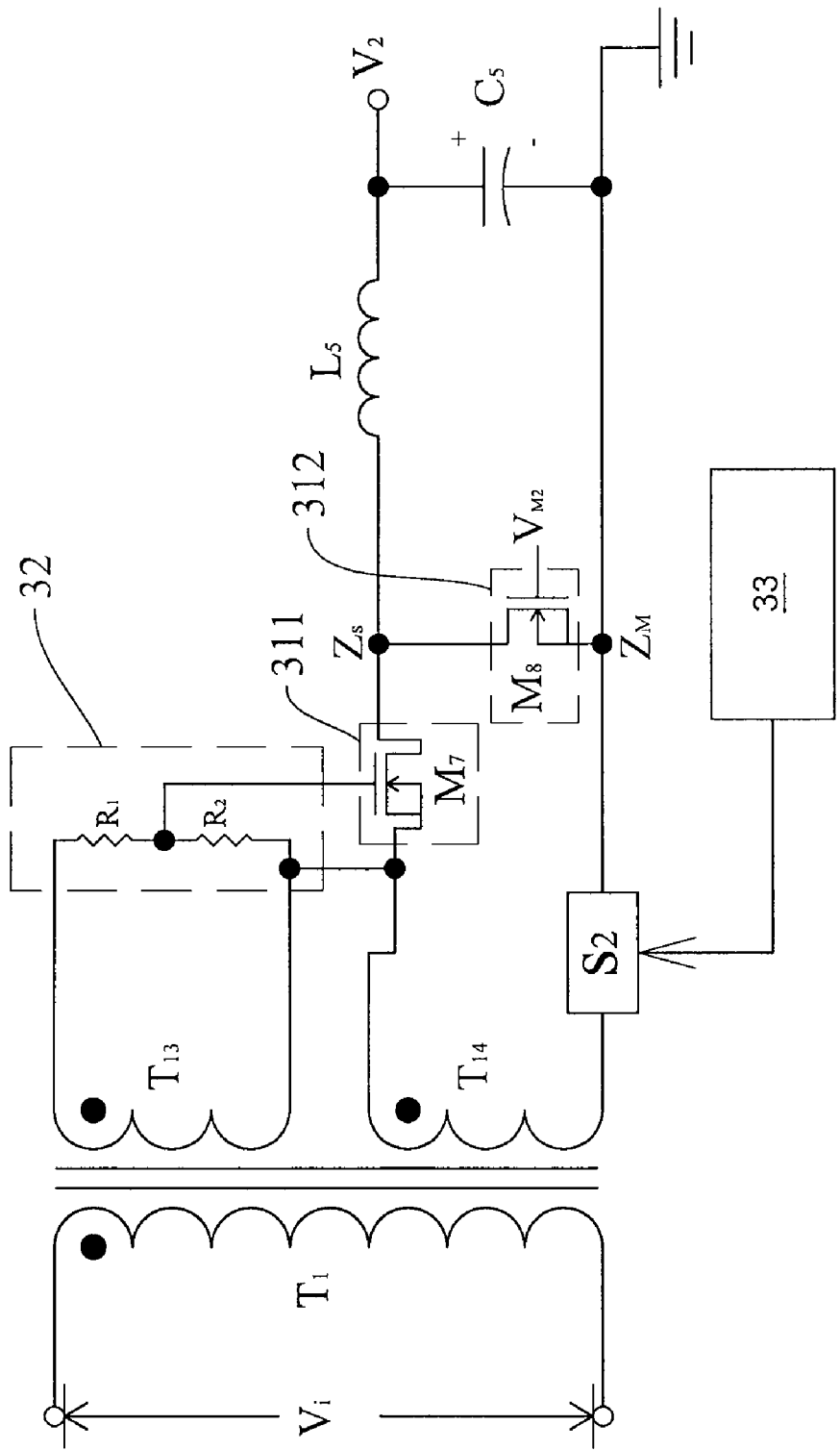

FIG. 11a, FIG. 12a and FIG. 13a are three alternative circuit diagrams of slave outputs according to the example of high-side SSPR $S_2$ shown in FIG. 10a, while FIG. 11b, FIG. 12b and FIG. 13b are three alternative circuit diagrams of slave outputs according to the example of low-side SSPR $S_2$ shown FIG. 10b. The slave forward rectifier 311 and the slave freewheeling rectifier is implemented, but not limited, by nMOSFET transistors, noted a synchronous forward transistor $M_7$ and a synchronous freewheeling transistor $M_8$. The drains, sources and gates of the forward transistor $M_7$ and the freewheeling transistor $M_8$ serve as the first terminals, second terminals and the control terminals of the slave forward rectifiers 311 and the freewheeling rectifiers 312 respectively, and the drains are connected at the common point $Z_s$.

The examples respectively shown in FIG. 11a, FIG. 11b, FIG. 12a and FIG. 12b are unipolar driving mode, which means the driving voltage is always the same (direct). The examples respectively shown in FIG. 13a and FIG. 13b are bipolar driving mode, which means the driving voltage is alternative.

In the examples shown in FIG. 11a and FIG. 11b, the drive circuit 32 includes a diode $D_7$ and an interlocked switch circuit. The interlocked switch circuit includes an NPN bipolar transistor $Q_1$, a PNP bipolar transistor $Q_2$, and two resistors $R_1$ and $R_2$. Emitters of the transistors $Q_1$ and $Q_2$ are connected at a connection point, and the connection point is connected to the gate of the forward transistor $M_7$. Bases of the two transistors $Q_1$ and $Q_2$ are connected at another point and the point is connected to the collectors of the transistors $Q_1$ and $Q_2$ through the resistors $R_1$ and $R_2$, respectively. The collectors of the transistors $Q_1$ and $Q_2$ are connected to a cathode of the diode $D_7$ and the second terminal of the secondary driving winding $T_{13}$ respectively, and then the anode of the diode $D_7$ is connected to the first terminal of the secondary driving winding $T_{13}$.

In the examples shown in FIG. 12a and FIG. 12b, the drive circuit 32 includes two resistors $R_3$, $R_4$ and an interlocked switch circuit. The interlocked switch circuit includes a diode $D_s$ and a PNP bipolar transistor $Q_3$, wherein the anode and the cathode of the diode $D_s$ are connected to the base and emitter of $Q_3$. The base of $Q_3$ is connected to the dotted terminal (first terminal) of the slave secondary driving winding $T_{13}$. The collector and the emitter of $Q_3$ are connected to the second terminal of the slave secondary driving winding $T_{13}$ and the gate of the slave forward transistor $M_7$. The resistor $R_4$ is connected between the collector and the emitter of the $Q_3$.

Table 2 lists the polarities of the voltage across $T_{13}$ and the gate voltage of $M_7$ within one switching period according to the embodiments in FIG. 11a, FIG. 11b, FIG. 12a and FIG. 12b:

TABLE 2

| on-interval | | reset-interval | | dead-interval | |
|---|---|---|---|---|---|
| $T_{13}$ | $M_7$ | $T_{13}$ | $M_7$ | $T_{13}$ | $M_7$ |
| + | + | − | 0 | 0 | 0 |

It can be seen from Table 2 that the gate voltage of $M_7$ is unipolar.

In the examples shown in FIG. 13a and FIG. 13b, the drive circuit 32 merely includes two resistors $R_1$ and $R_2$ connected with each other, which are respectively connected to the first terminal and the second terminal of the secondary driving winding $T_{13}$. The connection point of the resistors $R_1$ and $R_2$ is connected to the gate of the forward transistor $M_7$, and the resistor $R_2$ is connected between the gate and the source of the forward transistor $M_7$.

Table 3 lists the polarities of the voltage across $T_{13}$ and the gate voltage of $M_7$ within one switching period according to the embodiments in FIG. 13a and FIG. 13b:

TABLE 3

| on-interval | | reset-interval | | dead-interval | |
|---|---|---|---|---|---|
| $T_{13}$ | $M_7$ | $T_{13}$ | $M_7$ | $T_{13}$ | $M_7$ |
| + | + | − | − | 0 | 0 |

It can be seen from Table 3 that the gate voltage of $M_7$ is bipolar.

Figure 14:
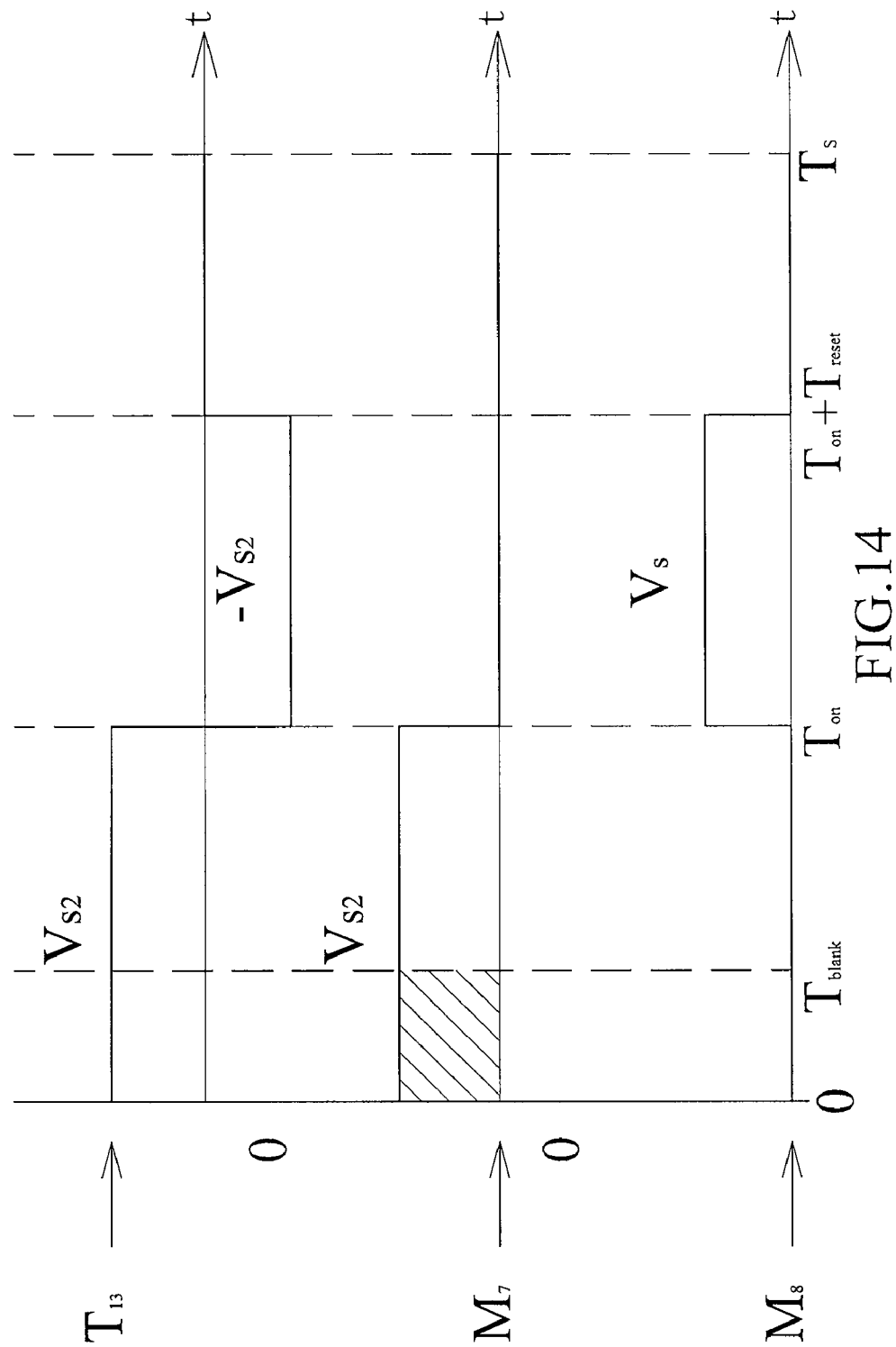
FIG. 14 is a time sequence diagram illustrating voltage waveforms of the secondary drive winding, the gate of the forward synchronous rectifier and the gate of the freewheeling synchronous rectifier of the slave outputs of multiple-output forward converters without a level shifter within one switching period according to the present invention.

FIG. 14 illustrates the time sequence of the voltage waveforms of the secondary drive winding $T_{13}$, the gate of the synchronous forward transistor $M_7$ and the gate of the synchronous freewheeling transistor $M_8$ of the slave outputs of the examples shown in FIG. 11a, FIG. 11b, FIG. 12a and FIG. 12b accompanying with the master output of the example shown in FIG. 5 within one switching period.

During the on-interval $0 \leq t \leq T_{on}$, the voltage across $T_{13}$ is $V_{s2}$; $M_7$ is turned on by a positive driving voltage $V_{s2}$ but $M_8$ is turned off by a zero driving voltage. During the blanking-interval $0 \leq t \leq T_{blank}$, the voltage across $T_{14}$ is positive with respect to its reference polarity; $S_2$ is turned off; the voltage waveform across $T_{14}$ is blanked by $S_2$; no current flows through the channel or body diode of $M_7$; the continuous current of $L_5$ forces the body diode of $M_8$ to conduct; $L_5$ releases electric energy through the body diode of $M_8$ and $C_5$. During the non-blanking interval $T_{blank} \leq t \leq T_{on}$, the voltage across $T_{14}$ is negative with respect to its reference polarity; $S_2$ is turned on; the voltage waveform across $T_{14}$ is not blanked by $S_2$; the continuous current of $L_5$ commutates from the body diode of $M_8$ to $M_7$; $L_5$ stores electric energy through $M_7$, $S_2$, $T_{14}$ and $C_5$.

During the reset-interval $T_{on} \leq t \leq T_{on}+T_{reset}$, the voltage across $T_{13}$ is $-V_{s2}$; $M_7$ is turned off by a zero driving voltage but $M_8$ is turned on by a positive driving voltage $V_s$; $L_5$ releases electric energy through $M_8$ and $C_5$.

During the dead-interval $T_{on}+T_{reset} \leq t \leq T_s$, the voltage across $T_{13}$ is 0; both $M_7$ and $M_8$ are turned off; the continuous current of $L_5$ forces the body diode of $M_8$ to conduct; $L_5$ releases electric energy through the body diode of $M_8$ and $C_5$.

Figure 15:
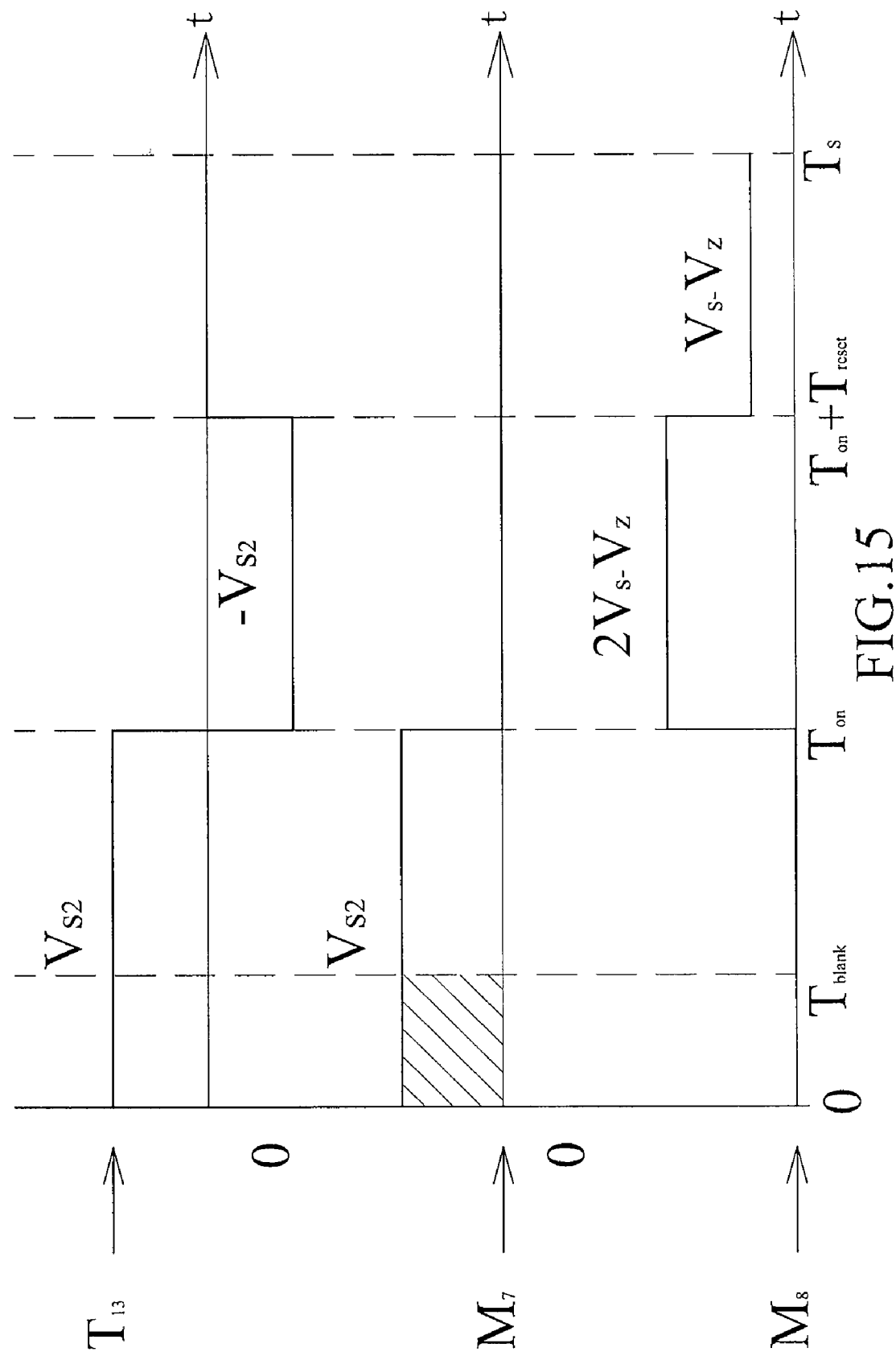
FIG. 15 is a time sequence diagram illustrating voltage waveforms of the secondary drive winding, the gate of the forward synchronous rectifier and the gate of the freewheeling synchronous rectifier of the slave outputs of multiple-output forward converters with a level shifter within one switching period according to the present invention.

FIG. 15 illustrates the time sequence of the voltage waveforms of the secondary drive winding $T_{13}$, the gate of the synchronous forward transistor $M_7$ and the gate of the synchronous freewheeling transistor $M_8$ of the slave outputs of the examples shown in FIG. 11a, FIG. 11b, FIG. 12a and FIG. 12b accompanying with the master output of the example shown in FIG. 8 within one switching period.

During the on-interval $0 \leq t \leq T_{on}$, the voltage across $T_{13}$ is $V_{s2}$; $M_7$ is turned on by a positive driving voltage $V_{s2}$ but $M_8$ is turned off by a zero driving voltage. During the blanking-interval $0 \leq t \leq T_{blank}$, $L_5$ releases electric energy through the body diode of $M_8$ and $C_5$. During the non-blanking interval $T_{blank} \leq t \leq T_{on}$, $L_5$ stores electric energy through $M_7$, $S_2$, $T_{14}$ and $C_5$.

During the reset-interval $T_{on} \leq t \leq T_{on}+T_{reset}$, the voltage across $T_{13}$ is $-V_{s2}$; $M_7$ is turned off by a zero driving voltage but $M_8$ is turned on by a positive driving voltage $2V_s-V_z$; $L_5$ releases electric energy through $M_8$ and $C_5$.

During the dead-interval $T_{on}+T_{reset} \leq t \leq T_s$, the voltage across $T_{13}$ is 0; $M_7$ is turned off but $M_8$ is turned on by a positive driving voltage $V_s-V_z$; $L_5$ releases electric energy through $M_8$ and $C_5$.

Figure 16:
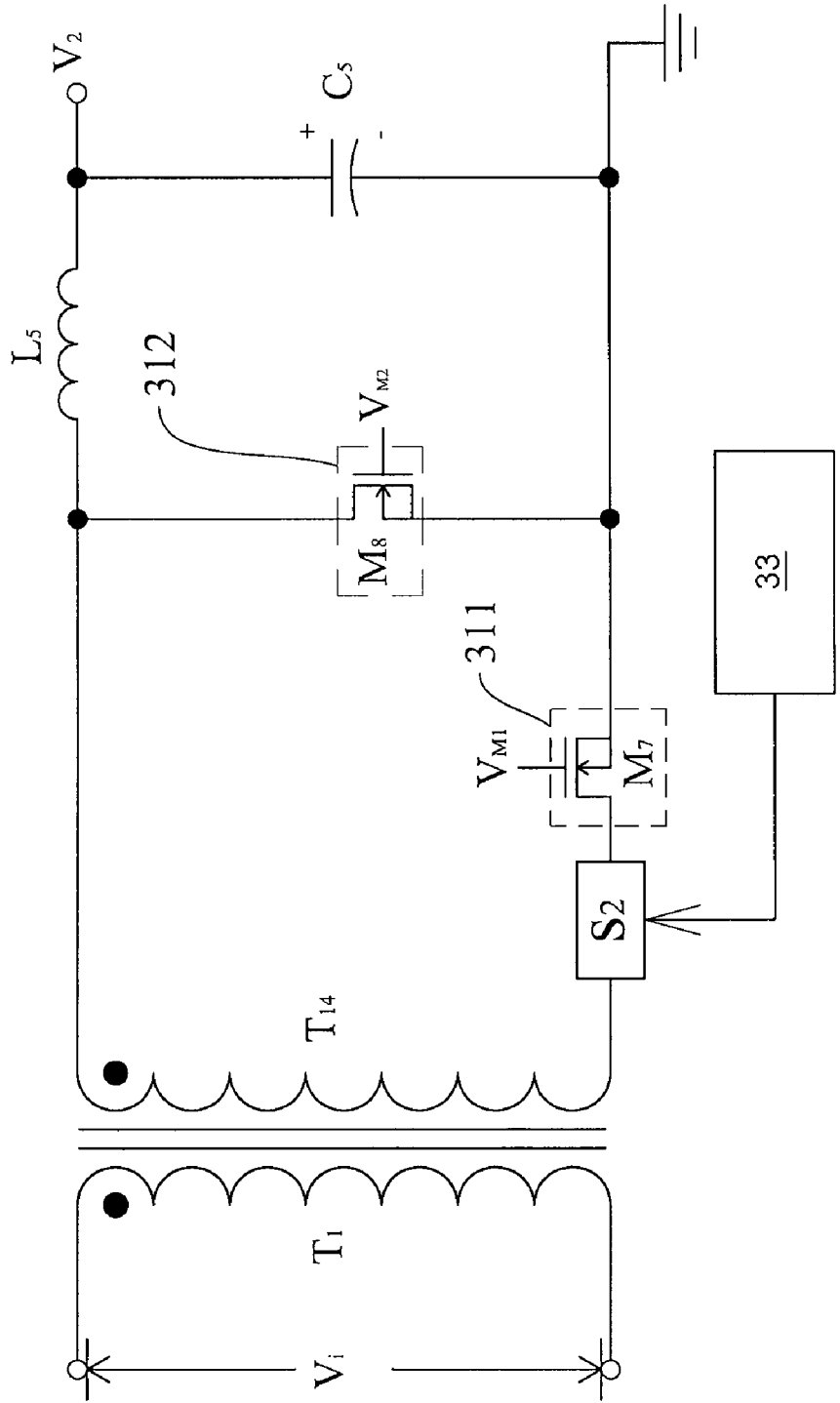
FIG. 16 is a diagram illustrating a practical circuit of the slave output of a multiple-output forward converter according to the present invention, wherein the SSPR is a controlled switch placed at low-side, and the drive voltages of the slave forward and freewheeling rectifiers come from those of the master forward and freewheeling rectifiers respectively.

FIG. 16 illustrates a circuit of slave outputs with a low-side SSPR $S_2$ and a low-side slave synchronous forward transistor $M_7$, and the SSPR $S_2$ is a controlled switch. As shown, the example does not need a slave drive circuit. The slave synchronous forward transistor $M_7$ and the slave synchronous freewheeling transistor $M_8$ are driven by the driving voltages of the master synchronous forward transistor and the master synchronous freewheeling transistor.

Figure 17A:
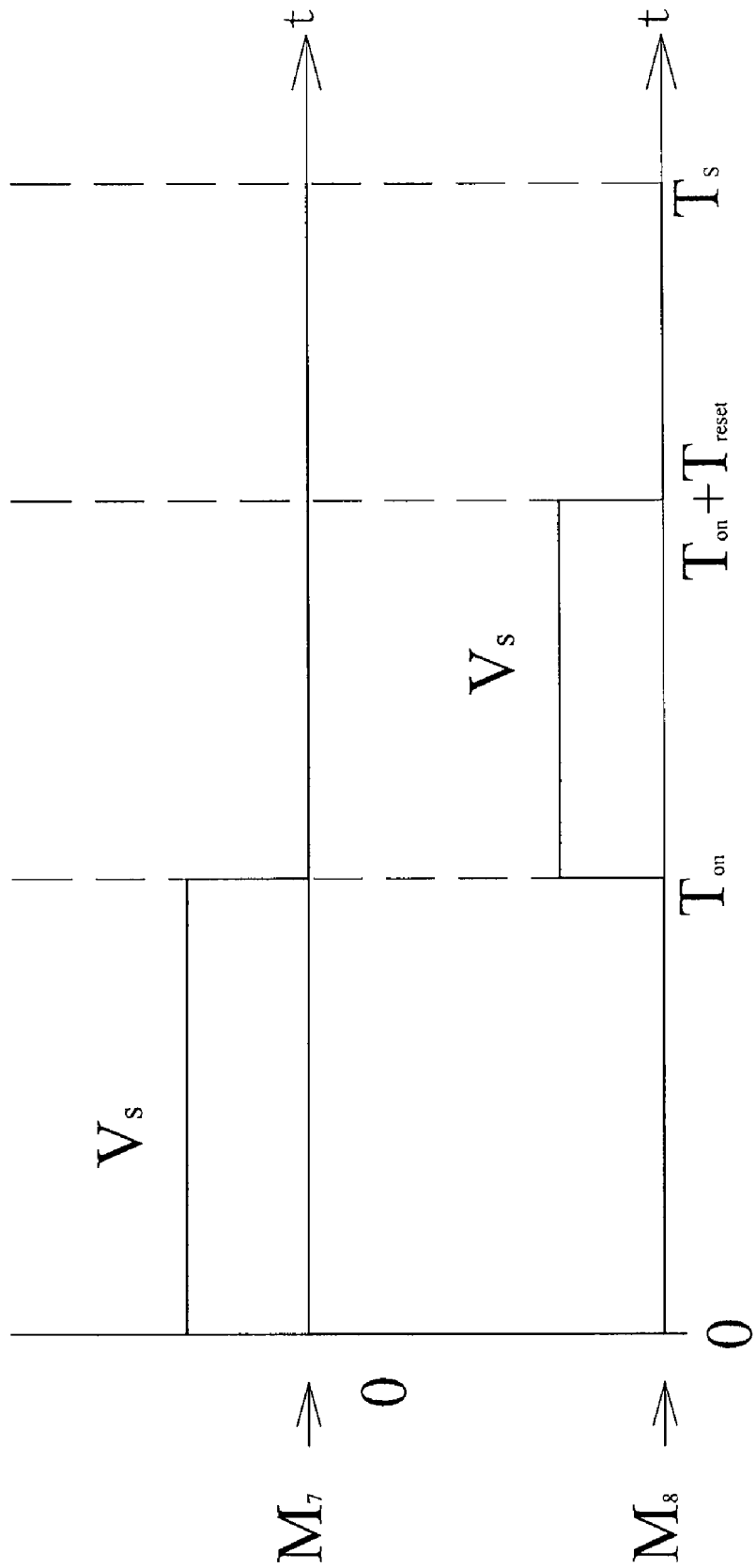
FIG. 17a and FIG. 17b are time sequence diagrams illustrating the gate voltage waveforms of the slave forward and freewheeling synchronous rectifiers of multiple-output forward converters without and with a level shifter respectively according to the present invention.
Figure 17B:
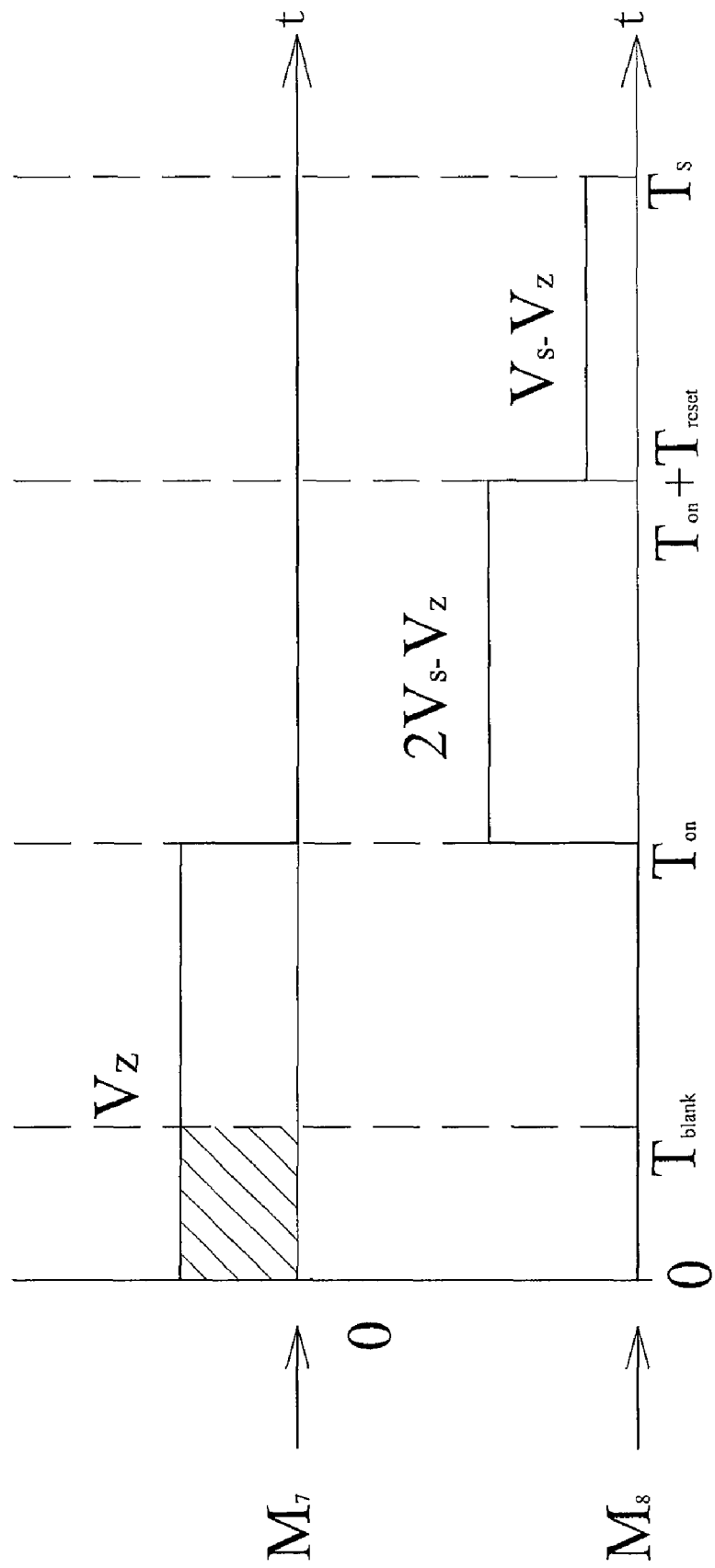

FIG. 17a and FIG. 17b illustrate the time sequence of the voltage waveforms of the gate of the slave synchronous forward transistor $M_7$ and the gate of the slave synchronous freewheeling transistor $M_8$ of the example shown in FIG. 16 accompanying with the master output shown in FIG. 5 and FIG. 8 respectively within one switching period. During the on-interval $0 \leq t \leq T_{on}$, $M_7$ is turned on by positive driving voltages $V_s$ (FIG. 17a) and $V_z$ (FIG. 17b) but $M_8$ is turned off by a zero driving voltage. During the reset-interval $T_{on} \leq t \leq T_{on}+T_{reset}$, $M_7$ is turned off by a zero driving voltage but $M_8$ is turned on by positive driving voltages $V_s$ (FIG. 17a) and $2V_s-V_z$ (FIG. 17b). During the dead-interval $T_{on}+T_{reset} \leq t \leq T_s$, $M_7$ is turned off but $M_8$ is turned off in the example shown in FIG. 17a, but is still turned on by a positive driving voltage $V_s-V_z$ in the example shown in FIG. 17b.

It should be noted that the forward transistor and the freewheeling transistor may be but not limited to an N-channel metal-oxide semiconductor field-effect transistor (N-channel MOSFET), a P metal-oxide semiconductor field-effect transistor (P-channel MOSFET), an N-channel junction field effect transistor (N-channel JFET) or a P-channel junction field effect transistor (P-channel JFET).

While the invention has been described in terms of what are presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A forward converter with self-driven synchronous rectifiers, comprising:
   a transformer comprising a primary winding, a secondary driving winding and a secondary power winding, wherein the primary winding is connected with an external power supply;
   a master power loop comprising a forward rectifier, a freewheeling rectifier and a power inductor and connected to the secondary power winding of the transformer, wherein the master power loop comprises a master voltage output terminal and a ground terminal, a filter capacitor is connected between the master voltage output terminal and the ground terminal, first terminals of the freewheeling rectifier and the forward rectifier are respectively connected to a first terminal and a second terminal of the secondary power winding, second terminals of the freewheeling rectifier and the forward rectifier are connected at a connection point, the connection point is connected to the ground terminal, and a power inductor is serially connected between the first terminal of the secondary power winding and the voltage output terminal; and
   a signal distributor comprising a first output terminal, a second output terminal and a common connection terminal, wherein the first output terminal and the second output terminal are respectively connected to control terminals of the freewheeling rectifier and the forward rectifier, the common connection terminal is connected with the connection point of the second terminals of the forward rectifier and the freewheeling rectifier, wherein that the common connection terminal is conducted to the first terminal or the second terminal depends on a voltage difference between the first output terminal and the second output terminal to distribute a voltage signal to the control terminal of the forward rectifier or the freewheeling rectifier, wherein the signal distributor comprises a first diode and a second diode, anodes of the first diode and the second diode are connected with the common connection terminal, and cathodes of the first diode and the second diode serve as the first output terminal and the second output terminal, respectively, and the signal distributor is connected directly or through a level shifter to the secondary driving winding.

2. The forward converter with self-driven synchronous rectifiers according to claim 1, wherein the first terminal and the second terminal of the secondary driving winding are respectively connected to the first output terminal and the second output terminal of the signal distributor for providing the voltage signal.

3. The forward converter with self-driven synchronous rectifiers according to claim 1, wherein the level shifter comprising a first input terminal, a second input terminal, a first output terminal and a second output terminal, wherein the first input terminal and the second input terminal are respectively connected to the first terminal and the second terminal of the secondary driving winding, the first output terminal and the second output terminal are respectively connected to the first output terminal and the second output terminal of the signal distributor to shift the output voltage by an amount, wherein the level shifter comprises a capacitor, a diode and a Zener diode, one terminal of the capacitor serves as the first input terminal, the other terminal of the capacitor serves as the first output terminal and is connected with an anode of the diode, a cathode of the diode is connected with a cathode of the Zener diode, and an anode of the Zener diode serves as the second input terminal and the second output terminal simultaneously.

4. The forward converter with self-driven synchronous rectifiers according to claim 1, further comprising a slave output comprising
   a slave secondary power winding,
   a secondary side post regulator (SSPR), and
   a slave power loop, wherein the slave power loop comprises
      a slave forward rectifier,
      a slave freewheeling rectifier,
      a slave power inductor,
      a slave voltage output terminal,
      a ground terminal, and
      a slave filter capacitor connected between the slave voltage output terminal and the ground terminal, the second terminals of the slave forward rectifier and the slave freewheeling rectifier are connected with the ground terminal, and the slave power inductor is connected between the first terminal of the slave freewheeling rectifier and the slave voltage output terminal.

5. The forward converter with self-driven synchronous rectifiers according to claim 4, wherein the control terminal of the slave forward rectifier is connected to the control terminal of the forward rectifier of the master power loop, the SSPR is connected between the first terminal of the slave freewheeling rectifier and the first terminal of the slave secondary power winding, the first terminal of the slave forward rectifier is connected to the second terminal of the slave secondary power winding, or between the first terminal of the slave forward rectifier and the second terminal of the slave secondary power winding, the first terminal of the slave freewheeling rectifier is connected to the first terminal of the slave secondary power winding, and the SSPR is a controlled switch driven by an integrated circuit (IC) driver.

6. The forward converter with self-driven synchronous rectifiers according to claim 4, wherein the control terminal of the slave forward rectifier is connected to a slave drive circuit connected to a slave secondary driving winding, the SSPR is connected between the first terminal of the slave freewheeling rectifier and the first terminal of the slave secondary power winding, the first terminal of the slave forward rectifier is connected to the second terminal of the slave secondary power winding, or between the first terminal of the slave forward rectifier and the second terminal of the slave secondary power winding, the first terminal of the slave freewheeling rectifier is connected to the first terminal of the slave secondary power winding, and the SSPR is a controlled switch driven by an integrated circuit (IC) driver.

7. The forward converter with self-driven synchronous rectifiers according to claim 6 wherein the slave drive circuit comprises a diode, an NPN bipolar transistor, a PNP bipolar transistor, a first resistor, and a second resistor, emitters of the NPN bipolar transistor and the PNP bipolar transistor are connected to the control terminal of the second forward rectifier, bases of the NPN bipolar transistor and the PNP bipolar transistor are connected with a connection point, one terminal of the first resistor and one terminal of the second resistor are connected with the connection point, the other terminal of the first resistor and the other terminal of the second resistor are respectively connected to collectors of the NPN bipolar transistor and the PNP bipolar transistor, which are respectively connected to the cathode of the diode and the second terminal of the slave secondary driving winding, and the anode of the diode is connected to the first terminal of the slave secondary driving winding.

8. The forward converter with self-driven synchronous rectifiers according to claim 6, wherein the slave drive circuit comprises a diode, a PNP bipolar transistor, a first resistor, and a second resistor, an anode and an cathode of the diode are respectively connected to an base and an emitter of the PNP bipolar transistor, the first resistor is connected between the base of the PNP bipolar transistor and an first terminal of the slave secondary driving winding, the second resistor is connected between an collector and the emitter of the PNP bipolar transistor, and the collector and the emitter of the PNP bipolar transistor are respectively connected to the secondary terminal and the control terminal of the slave forward rectifier.

9. The forward converter with self-driven synchronous rectifiers according to claim 6, wherein the drive circuit comprises a first resistor and a second resistor, one terminal of the first resistor and one terminal of the second resistor are respectively connected to the first terminal and the second terminal of the slave secondary driving winding, and the other terminal of the first resistor and the other terminal of the second resistor are connected to the control terminal of the slave forward rectifier.

10. The forward converter with self-driven synchronous rectifiers according to claim 4, wherein the slave forward rectifier is an N-channel metal-oxide semiconductor field-effect transistor (N-channel MOSFET), a P-channel metal-oxide semiconductor field-effect transistor (P-channel MOSFET), an N-channel junction field effect transistor (N-channel JFET), or a P-channel junction field effect transistor (P-channel JFET).

11. The forward converter with self-driven synchronous rectifiers according to claim 4, wherein the slave freewheeling rectifier is an N-channel MOSFET, a P-channel MOSFET, an N-channel JFET, or a P-channel JFET.

12. The forward converter with self-driven synchronous rectifiers according to claim 1, further comprising a slave output comprising
 a slave secondary power winding,
 a secondary side post regulator (SSPR), and
 a slave power loop, wherein the slave power loop comprises
  a slave forward rectifier,
  a slave freewheeling rectifier,
  a slave power inductor,
  a slave voltage output terminal,
  a ground terminal, and
  a slave filter capacitor connected between the slave voltage output terminal and the ground terminal, the first terminals of the slave forward rectifier and the slave freewheeling rectifier are connected with a connection point, the slave power inductor is connected between the connection point and the slave voltage output terminal, and the second terminal of the slave freewheeling rectifier is connected to the ground terminal.

13. The forward converter with self-driven synchronous rectifiers according to claim 12, wherein the control terminal of the slave forward rectifier is connected to a slave drive circuit connected to a slave secondary driving winding, the SSPR is connected between the second terminal of the slave forward rectifier and the first terminal of the slave secondary power winding, the second terminal of the slave freewheeling rectifier is connected to the second terminal of the slave secondary power winding, or between the second terminal of the slave freewheeling rectifier and the second terminal of the slave secondary power winding, the second terminal of the slave forward rectifier is connected to the first terminal of the slave secondary power winding, and the SSPR is a controlled switch driven by an integrated circuit (IC) driver or a magnetic amplifier(MA) driven by a reset circuit.

14. The forward converter with self-driven synchronous rectifiers according to claim 13 wherein the slave drive circuit comprises a diode, an NPN bipolar transistor, a PNP bipolar transistor, a first resistor, and a second resistor, emitters of the NPN bipolar transistor and the PNP bipolar transistor are connected to the control terminal of the second forward rectifier, bases of the NPN bipolar transistor and the PNP bipolar transistor are connected with a connection point, one terminal of the first resistor and one terminal of the second resistor are connected with the connection point, the other terminal of the first resistor and the other terminal of the second resistor are respectively connected to collectors of the NPN bipolar transistor and the PNP bipolar transistor, which are respectively connected to the cathode of the diode and the second terminal of the slave secondary driving winding, and the anode of the diode is connected to the first terminal of the slave secondary driving winding.

15. The forward converter with self-driven synchronous rectifiers according to claim 13, wherein the slave drive circuit comprises a diode, a PNP bipolar transistor, a first resistor, and a second resistor, an anode and an cathode of the diode are respectively connected to an base and an emitter of the PNP bipolar transistor, the first resistor is connected between the base of the PNP bipolar transistor and an first terminal of the slave secondary driving winding, the second resistor is connected between an collector and the emitter of the PNP bipolar transistor, and the collector and the emitter of the PNP bipolar transistor are respectively connected to the secondary terminal and the control terminal of the slave forward rectifier.

16. The forward converter with self-driven synchronous rectifiers according to claim 13, wherein the drive circuit comprises a first resistor and a second resistor, one terminal of the first resistor and one terminal of the second resistor are respectively connected to the first terminal and the second terminal of the slave secondary driving winding, and the other terminal of the first resistor and the other terminal of the second resistor are connected to the control terminal of the slave forward rectifier.

17. The forward converter with self-driven synchronous rectifiers according to claim 12, wherein the slave forward rectifier is an N-channel MOSFET, a P-channel MOSFET, an N-channel JFET, or a P-channel JFET.

18. The forward converter with self-driven synchronous rectifiers according to claim 12, wherein the slave freewheeling rectifier is an N-channel MOSFET, a P-channel MOSFET, an N-channel JFET, or a P-channel JFET.

19. The forward converter with self-driven synchronous rectifiers according to claim 1, wherein the forward rectifier is an N-channel MOSFET, a P-channel MOSFET, an N-channel JFET, or a P-channel JFET.

20. The forward converter with self-driven synchronous rectifiers according to claim 1, wherein the freewheeling rectifier is an N-channel MOSFET, a P-channel MOSFET, an N-channel JFET, or a P-channel JFET.

* * * * *